(12) United States Patent
Shiina

(10) Patent No.: US 7,619,953 B2
(45) Date of Patent: Nov. 17, 2009

(54) RECORDING AND PLAYBACK APPARATUS, RECORDING AND PLAYBACK METHOD, AND PROGRAM

(75) Inventor: Hiroki Shiina, Kanagawa (JP)

(73) Assignee: Sony Corporation (JP)

( * ) Notice: Subject to any disclaimer, the term of this patent is extended or adjusted under 35 U.S.C. 154(b) by 618 days.

(21) Appl. No.: 11/274,382

(22) Filed: Nov. 15, 2005

(65) Prior Publication Data
US 2006/0104606 A1 May 18, 2006

(30) Foreign Application Priority Data
Nov. 17, 2004 (JP) .............................. 2004-333059

(51) Int. Cl.
*G11B 5/09* (2006.01)
(52) U.S. Cl. ................. 369/47.15; 369/30.58; 369/53.2
(58) Field of Classification Search ................... 386/46, 386/95; 369/112.15; *H04N 5/781; G11B 7/00*
See application file for complete search history.

(56) References Cited

U.S. PATENT DOCUMENTS

| 6,814,283 | B2 * | 11/2004 | Fujimoto | .................... 235/382 |
| 7,043,620 | B2 * | 5/2006 | Matsuno et al. | ............. 711/170 |
| 7,346,169 | B2 * | 3/2008 | Asano et al. | ................. 380/278 |
| 2002/0025039 | A1 * | 2/2002 | Kato et al. | .................... 380/44 |
| 2002/0144114 | A1 * | 10/2002 | Barnard et al. | ............. 713/166 |
| 2005/0235156 | A1 * | 10/2005 | Chen | ........................ 713/182 |

FOREIGN PATENT DOCUMENTS

| JP | 2003-331563 | | 11/2003 |
| JP | 2003096346 A1 | * | 11/2003 |
| WO | WO 01/99333 | * | 12/2001 |

* cited by examiner

*Primary Examiner*—Wayne R Young
*Assistant Examiner*—Adam R Giesy
(74) *Attorney, Agent, or Firm*—Lerner, David, Littenberg, Krumholz & Mentlik, LLP

(57) ABSTRACT

A recording and playback apparatus for recording data on a recording medium that allows additional writing includes a recording device configured to record first data on the recording medium; a random-number generator configured to generate a random number; and a calculator configured to calculate a first identification code indicating that the first data has been recorded on the recording medium by the recording and playback apparatus, by applying a predetermined function to data included in the first data recorded on the recording medium by the recording device, the data including second data that changes on each recording on the recording medium by the recording device and including the random value generated by the random-value generator. The recording device further records the random value generated by the random-number generator and the first identification code calculated by the calculator so that the random value and the first identification code are included in the first data.

10 Claims, 18 Drawing Sheets

FIG. 4

| NUMBER OF TITLES | 2 | START ADDRESS OF EACH VTS |
|---|---|---|
| VTS#1 | 10 | START AND END ADDRESSES OF EACH CHAPTER |
| VTS#2 | 20 | START AND END ADDRESSES OF EACH CHAPTER |

FIG. 15

| DISK IDENTIFICATION CODE | DATA REGARDING OPTICAL DISK | DATE AND TIME OF LAST USE | USAGE FREQUENCY |
|---|---|---|---|
| DISK IDENTIFICATION CODE A | THUMBNAIL IMAGE 111-1 | 2004/10/15 | 2 |
| | THUMBNAIL IMAGE 111-2 | 2004/10/15 | 2 |
| | THUMBNAIL IMAGE 111-3 | 2004/10/15 | 2 |
| | THUMBNAIL IMAGE 111-4 | 2004/10/15 | 2 |
| | THUMBNAIL IMAGE 111-5 | 2004/10/15 | 2 |
| | THUMBNAIL IMAGE 111-6 | 2004/10/15 | 2 |

| DISK IDENTIFICATION CODE |
|---|
| DISK IDENTIFICATION CODE A |

RECORDING AND PLAYBACK APPARATUS, RECORDING AND PLAYBACK METHOD, AND PROGRAM

CROSS-REFERENCES TO RELATED APPLICATIONS

The present invention contains subject matter related to Japanese Patent Application JP 2004-333059 filed in the Japanese Patent Office on Nov. 17, 2004, the entire contents of which are incorporated herein by reference.

BACKGROUND OF THE INVENTION

The present invention relates to recording and playback apparatuses, recording and playback methods, and programs. More specifically, the present invention relates to a recording and playback apparatus, a recording and playback method, and a program with which it is possible to readily determine whether recording on a recording medium was performed by a recording and playback apparatus of the same machine type.

Recently, various types of DVD (Digital Versatile Disk) recording and playback apparatuses, such as DVD recorders and DVD video cameras, are sold.

For example, Japanese Unexamined Patent Application Publication No. 2003-331563 discloses a DVD recording and playback apparatus that is capable of recording and playing back moving images and still images.

SUMMARY OF THE INVENTION

However, depending on the types of DVD recording and playback apparatuses, different formats are used for recording data. Thus, when data is recorded by a DVD recording and playback apparatus of a certain machine type on a DVD that allows additional writing and then data is added on the DVD by a DVD recording and playback apparatus of a different machine type, in some cases, it is desired to allow a user to recognize that the added data has been recorded by an apparatus of a different machine type. However, it has been difficult to determine whether data already recorded on a DVD was recorded by an apparatus of the same machine type as an own machine or by an apparatus of a different machine type.

It is desired that it is readily possible to determine whether recording on a recording medium was performed by an apparatus of the same machine type as an own apparatus or by an apparatus of a different machine type.

According to an embodiment of the present invention, there is provided a recording and playback apparatus for recording data on a recording medium that allows additional writing. The recording and playback apparatus includes recording means for recording first data on the recording medium; random-number generating means for generating a random number; and calculating means for calculating a first identification code indicating that the first data has been recorded on the recording medium by the recording and playback apparatus, by applying a predetermined function to data included in the first data recorded on the recording medium by the recording means, the data including second data that changes on each recording on the recording medium by the recording means and including the random value generated by the random-value generating means. The recording means further records the random value generated by the random-number generating means and the first identification code calculated by the calculating means on the recording medium so that the random value and the first identification code are included in the first data.

The recording and playback apparatus may further include reading means for reading the first data recorded on the recording medium by the recording means; data generating means for generating third data by executing predetermined processing on the basis of specific data in the first data read by the reading means; storage means for storing the third data generated by the data generating means and a first identification code associated with the third data; and executing means for executing processing on the basis of the third data stored by the storage means when the third data is effective. In this case, the calculating means calculates a second identification code by applying the predetermined function to the data including the second data and the random value, the data being included in the first data read by the reading means, and the executing means assumes the third data stored in the storage means as effective and executes the processing on the basis of the third data when the second identification code calculated by the calculating means coincides with the first identification code read by the reading means and the first identification code read by the reading means coincides with the first identification code stored in the storage means.

The calculating means may calculate the first identification code by applying a function that yields an amount of data smaller than the data including the second data and the random value.

The calculating means may calculate the first identification code by applying a hash function to the data including the second data and the random value.

The second data may at least include data that is recorded only by the recording and playback apparatus.

The second data may include data for managing a program area of the recording medium and control data for the recording medium.

According to another embodiment of the present invention, there is provided a recording and playback method of a recording and playback apparatus for recording data on a recording medium that allows additional writing. The recording and playback method includes the steps of recording first data on the recording medium; generating a random number; calculating a first identification code indicating that the first data has been recorded on the recording medium by the recording and playback apparatus, by applying a predetermined function to data included in the first data recorded on the recording medium, the data including second data that changes on each recording on the recording medium and including the random value generated; and further recording the random value generated and the first identification code calculated on the recording medium so that the random value and the first identification code are included in the first data.

According to another embodiment of the present invention, there is provided a program for allowing a computer in a recording and playback apparatus to execute processing for recording data on a recording medium that allows additional writing. The processing includes the steps of recording first data on the recording medium; generating a random number; calculating a first identification code indicating that the first data has been recorded on the recording medium by the recording and playback apparatus, by applying a predetermined function to data included in the first data recorded on the recording medium, the data including second data that changes on each recording on the recording medium and including the random value generated; and further recording the random value generated and the first identification code calculated on the recording medium so that the random value and the first identification code are included in the first data.

According to these embodiments of the present invention, first data is recorded on a recording medium, a random number is generated, a first identification code indicating that the first data has been recorded on the recording medium by the recording and playback apparatus is calculated by applying a predetermined function to data included in the first data recorded on the recording medium, the data including second data that changes on each recording on the recording medium and including the random value, and the random value and the first identification code are further recorded on the recording medium so that the random value and the first identification code are included in the first data.

According to these embodiments of the present invention, data can be played back quickly from a recording medium. Furthermore, it is possible to quickly and readily determine whether recording on the recording medium was performed by an apparatus of the same machine type as an own machine or by an apparatus of a different machine type.

BRIEF DESCRIPTION OF THE DRAWINGS

FIG. 4 is a diagram showing a simple example configuration of a management table TV;

FIG. 15 is a diagram showing an example of data stored in a flash memory;

DETAILED DESCRIPTION

Figure 1:
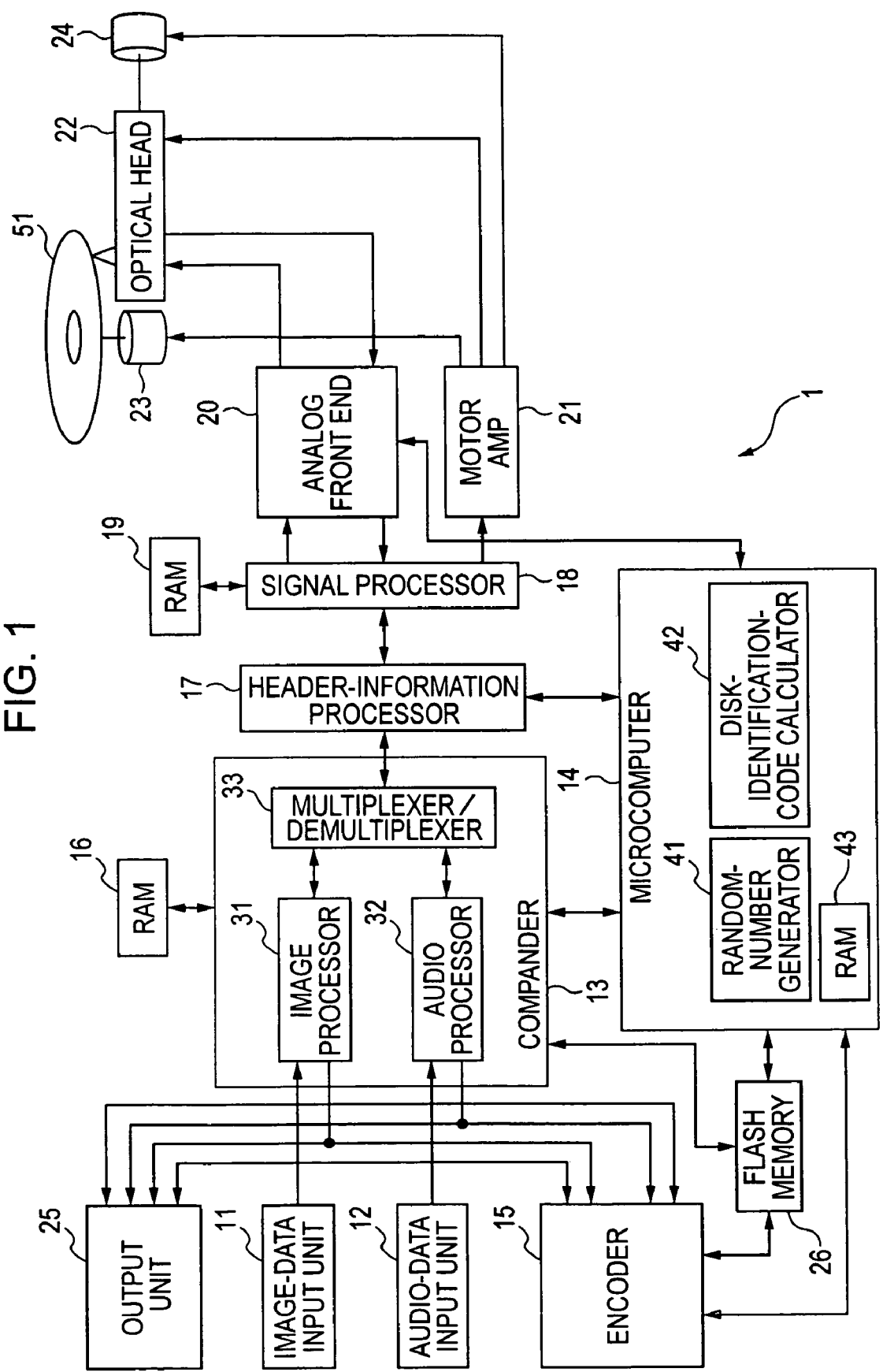
FIG. 1 is a diagram showing an example construction of a recording and playback apparatus according to an embodiment of the present invention.

Now, embodiments of the present invention will be described. The correspondence between the aspects of the present invention described in this specification and embodiments of the present invention is, for example, as follows. This description is intended to assure that embodiments supporting the aspects of the present invention described in this specification are described in this specification. Thus, even if an embodiment in the following description is not described as relating to a certain aspect of the present invention, that does not necessarily mean that the embodiment does not relate to that aspect of the present invention. Conversely, even if an embodiment is described herein as relating to a certain aspect of the present invention, that does not necessarily mean that the embodiment does not relate to other aspects of the present invention.

Furthermore, this description should not be construed as covering all the aspects of the present invention described in this specification. That is, the description does not deny the existence of aspects of the present invention that are described in this specification but not claimed in this application, i.e., the existence of aspects of the present invention that in future may be claimed by a divisional application, or that may be additionally claimed through amendments.

A recording and playback apparatus according to an embodiment of the present invention is a recording and playback apparatus (e.g., a recording and playback apparatus 1 shown in FIG. 1) for recording data on a recording medium (e.g., an optical disk 51 shown in FIG. 1) that allows additional writing. The recording and playback apparatus includes recording means (e.g., an analog front end 20, a motor amp 21, an optical head 22, a spindle motor 23, and a sled motor 24 shown in FIG. 1) for recording first data (e.g., data shown in FIG. 2) on the recording medium; random-number generating means (e.g., a random-number generator 41 shown in FIG. 1) for generating a random number; and calculating means (e.g., a disk-identification-code calculator 42 shown in FIG. 1) for calculating a first identification code (e.g., a disk identification code) indicating that the first data has been recorded on the recording medium by the recording and playback apparatus, by applying a predetermined function to data (e.g., a data sequence composed of a random value, a management table TV, and VMGI, shown in FIG. 9) included in the first data recorded on the recording medium by the recording means, the data including second data (data including the management table TV and VMGI, shown in FIG. 9) that changes on each recording on the recording medium by the recording means and including the random value generated by the random-value generating means. The recording means further records the random value generated by the random-number generating means and the first identification code calculated by the calculating means so that the random value and the first identification code are included in the first data.

Figure 7:
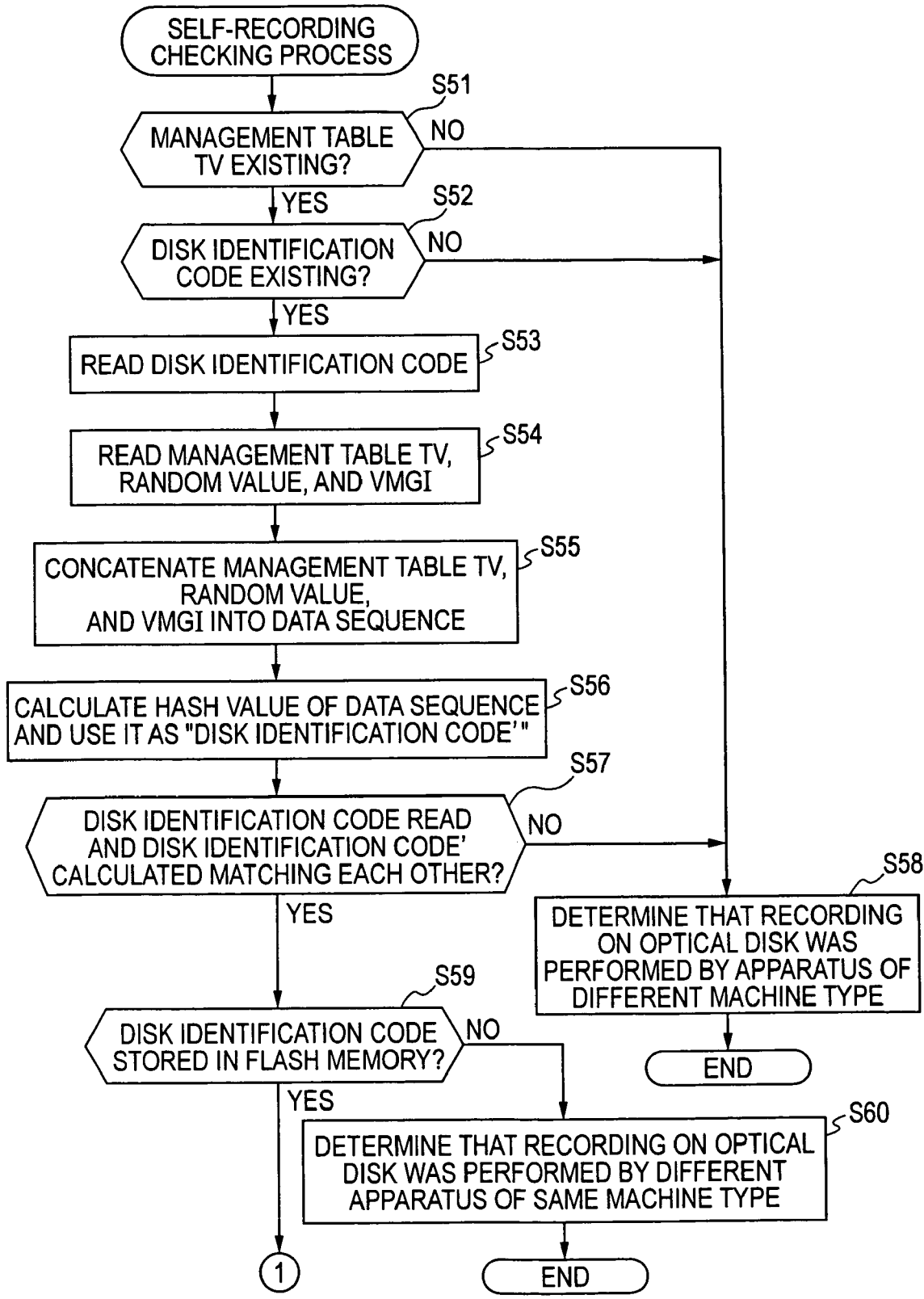
FIG. 7 is a flowchart of a self-recording checking process.

The recording and playback apparatus may further include reading means (e.g., the analog front end 20, the motor amp 21, the optical head 22, the spindle motor 23, and the sled motor 24 shown in FIG. 1) for reading the first data recorded on the recording medium by the recording means; data generating means (e.g., an image processor 31 shown in FIG. 1) for generating third data (e.g., thumbnail images) by executing predetermined processing on the basis of specific data (e.g., image data read in step S115 shown in FIG. 12) in the first data read by the reading means; storage means (e.g., a flash memory 26 shown in FIG. 1) for storing the third data generated by the data generating means and a first identification code associated with the third data; and executing means (e.g., a microcontroller 14, shown in FIG. 1, for executing step S63 shown in FIG. 8 or step S114 shown in FIG. 12) for executing processing on the basis of the third data stored by the storage means when the third data is effective (e.g., when step S59 shown in FIG. 7 results in YES) In this case, the calculating means calculates a second identification code by applying the predetermined function to the data including the second data and the random value, the data being included in the first data read by the reading means, and the executing means assumes the third data stored in the storage means as effective and executes the processing (e.g., step S63 shown in FIG. 8 or step S114 shown in FIG. 12) on the basis of the third data when the second identification code calculated by the calculating means coincides with the first identification code read by the reading means (e.g., when step S57 shown in FIG. 7 results in YES) and the first identification code read by the reading means coincides with the first identification code stored in the storage means (e.g., when step S59 shown in FIG. 7 results in YES).

The calculating means may calculate the first identification code by applying a function that yields an amount of data smaller than the data including the second data and the random value.

The calculating means may calculate the first identification code by applying a hash function to the data including the second data and the random value.

The second data may at least include data (e.g., the management table TV shown in FIG. 9) that is recorded only by the recording and playback apparatus.

The second data may include data (e.g., the management table TV shown in FIG. 9) for managing a program area of the recording medium and control data (e.g. VMGI shown in FIG. 9) for the recording medium.

A recording and playback method according to another embodiment of the present invention is a recording and playback method of a recording and playback apparatus (e.g., the recording and playback apparatus 1 shown in FIG. 1) for recording data on a recording medium (e.g., the optical disk 51 shown in FIG. 1) that allows additional writing. The recording and playback method includes the steps of recording (e.g., step S17 shown in FIG. 3) first data (e.g., the data shown in FIG. 2) on the recording medium; generating (e.g., step S142 shown in FIG. 14) a random number; calculating (e.g., step S144 shown in FIG. 14) a first identification code (e.g., a disk identification code) indicating that the first data has been recorded on the recording medium by the recording and playback apparatus, by applying a predetermined function to data (e.g., the data sequence composed of the random value, the management table TV, and the VMGI shown in FIG. 9) included in the first data recorded on the recording medium, the data including second data (the data composed of the management table TV and the VMGI shown in FIG. 9) that changes on each recording on the recording medium and including the random value generated; and further recording (e.g., step S147 shown in FIG. 14) the random value generated and the first identification code calculated so that the random value and the first identification code are included in the first data.

A program according to another embodiment of the present invention is a program for allowing a computer in a recording and playback apparatus to execute processing for recording data on a recording medium (e.g., the optical disk 51 shown in FIG. 1) that allows additional writing. The processing includes the steps of recording (e.g., step S17 shown in FIG. 3) first data (e.g., the data shown in FIG. 2) on the recording medium; generating (e.g., step S142 shown in FIG. 14) a random number; calculating (e.g., step S144 shown in FIG. 14) a first identification code (e.g., a disk identification code) indicating that the first data has been recorded on the recording medium by the recording and playback apparatus, by applying a predetermined function to data (e.g., the data sequence composed of the random value, the management table TV, and the VMGI shown in FIG. 9) included in the first data recorded on the recording medium, the data including second data (the data composed of the management table TV and the VMGI shown in FIG. 9) that changes on each recording on the recording medium and including the random value generated; and further recording (e.g., step S147 shown in FIG. 14) the random value generated and the first identification code calculated so that the random value and the first identification code are included in the first data.

FIG. 1 is a block diagram showing an example construction of a recording and playback apparatus 1 according to an embodiment of the present invention.

The recording and playback apparatus 1 is, for example, a portable video recorder that allows captured image data to be recorded on an optical disk 51, such as a rewritable digital versatile disk (DVD).

Referring to FIG. 1, the recording and playback apparatus 1 includes an image-data input unit 11, an audio-data input unit 12, a compander 13, a microcontroller 14, an encoder 15, a random access memory (RAM) 16, a header-information processor 17, a signal processor 18, a RAM 19, an analog front end 20, a motor amp 21, an optical head 22, a spindle motor 23, a sled motor 24, an output unit 25, and a flash memory 26.

More specifically, in the recording and playback apparatus 1, the image-data input unit 11 accepts input of image signals captured by an imager (e.g., a charge coupled device (CCD)) that is not shown or image signals input from an external device, executes analog-to-digital conversion on the image signals accepted, and outputs resulting image data. For example, the image-data input unit 11 outputs the image data to the encoder 15, the output unit 25, or an image processor 31 of the compander 13. The imager (not shown) included in the recording and playback apparatus 1 outputs moving images (composed of a plurality of still images) or still images under the control of the microcontroller 14. Thus, the image-data input unit 11 selectively outputs image data composed of moving images or still images with the imager controlled by the microcontroller 14.

The audio-data input unit 12 accepts input of audio signals acquired by a microphone that is not shown or input of audio signals input from an external device, executes analog-to-digital conversion on the audio signals accepted, and outputs resulting audio data. For example, the audio-data input unit 12 outputs the audio data to the encoder 15, the output unit 25, or an audio processor 32 of the compander 13.

The compander 13 switches its operation under the control of the microcontroller 14 to process data to be recorded or data to be played back. Furthermore, the compander 13 stores data relating to processing in the RAM 16 or the flash memory 26 as appropriate. More specifically, when recording image data fed from the image-data input unit 11 and audio data fed from the audio-data input unit 12 on the optical disk 51, the compander 13 compresses the image data and audio data and multiplexes the compressed image data and audio data using the RAM 16. Then, the compander 13 outputs the multiplexed data to the header-information processor 17. On the other hand, when playing back data recorded on the optical disk 51, demultiplexes data fed from the header-information processor 17 into image data and audio data, expands the demultiplexed image data and audio data, and outputs the expanded image data and audio data, similarly using the RAM 16. The RAM 16 stores data as needed under the control of the compander 13. Furthermore, the compander 13 generates thumbnail images base on image data, and stores the thumbnail images in the flash memory 26. In addition to the thumbnail images, the flash memory 26 also stores, for example, disk identification codes for identifying optical disks. Data stored in the flash memory 26 will be described later in detail.

The compander 13 includes an image processor 31, a video processor 32, and a multiplexer/demultiplexer 33.

In a recording operation, the image processor 31 of the compander 13, under the control of the microcontroller 14, compresses image data fed from the image-data input unit 11 and outputs compressed image data. When the image data constitutes moving images, the image processor 31 compresses the image data according to the MPEG (Moving Picture Expert Group)-2 standard. On the other hand, when the image data constitutes still images, the image processor 31 compresses the image data according to the JPEG (Joint Photographic Expert Group) standard. In a playback operation, the image processor 31 expands image data fed from the multiplexer/demultiplexer 33 in accordance with the compression format of the image data (e.g., MPEG2 or JPEG). Furthermore, the image processor 31 generates thumbnail images based on the image data.

The audio processor 32 of the compander 13, in a recording operation, compresses audio data fed from the audio-data input unit 12 according to MPEG, Dolby audio, linear PCM, or other formats. On the other hand, in a playback operation, the audio processor 32 expands audio data fed from the multiplexer/demultiplexer 33 in accordance with the compression format of the audio data.

The multiplexer/demultiplexer 33 of the compander 13, in a recording operation, multiplexes image data fed from the image processor 31 and audio data fed from the audio processor 32 by time division, and supplies the multiplexed data to the header-information processor 17. The data in which image data and audio data are multiplexed by time division will hereinafter be referred to as time-division multiplexed data. On the other hand, in a playback operation, the multiplexer/demultiplexer 33 demultiplexes time-division multiplexed data fed from the header-information processor 17 into image data and audio data, and supplies the image data and audio data to the image processor 31 and the audio processor 32, respectively.

The encoder 15 compresses image data fed from the image-data input unit 11 and audio data fed from the audio-data input unit 12, or image data and audio data output from the compander 13, on the basis of a predetermined format, and outputs compressed data to an external device. Thus, with the recording and playback apparatus 1, it is possible to output results of imaging or playback to an external device (not shown) and to monitor the results on the external device.

The output unit 25 includes, for example, a display and a speaker for outputting image data fed from the image-data input unit 11 and audio data fed from the audio-data input unit 12, or image data and audio data fed from the compander 13. Thus, the recording and playback apparatus 1 can output results of imaging (i.e., display images and output sounds). That is, with the recording and playback apparatus 1, it is possible to monitor results of playback.

The header-information processor 17, in a recording operation, accepts time-division multiplexed data fed from the compander 13, and under the control of the microcontroller 14, it attaches header information unique to 51 (DVD), header information of an extension file, and so forth, and outputs the result. Furthermore, based on information fed from the microcontroller 14, the header-information processor 17 generates data in a format such as UDF (Universal Disk Format), VMG (Video Manager), or VTSI (Video Title Set Information), and outputs the data to the signal processor 18. In a playback operation, the header-information processor 17 separates header information attached during recording from data fed from the signal processor 18, and outputs the header information to the compander 13. Furthermore, the header-information processor 17 notifies the microcontroller 14 of the header information separated. The extension file herein is a file that is not defined by the DVD video format defining the format of the optical disk 51. For example, the extension file is a file of a still image (a file compressed according to the JPEG standard).

The signal processor 18, in a recording operation, generates an error correcting code based on data fed from the header-information processor 17, and attaches the error correcting code to the data output from the header-information processor 17, using the RAM 19. Furthermore, the signal processor 18 executes processing such as scrambling or 8/16 modulation, and outputs the resulting serial data sequence to the analog front end 20. On the other hand, in a playback operation, the signal processor 18 executes decoding, descrambling, and error correction on data output from the analog front end 20, and outputs the result to the header-information processor 17. Furthermore, the signal processor 18 executes digital-to-analog conversion of various types of driving information fed from the microcontroller 14, i.e., driving information for spindle control, tracking control, focus control, and sled control, to generate driving signals for these purposes, and outputs the driving signals to the motor amp 21.

The analog front end 20 generates and outputs a light-intensity control signal for laser beams emitted from the optical head 22 toward the optical disk 51. In a playback operation, the analog front end 20 maintains the light intensity of laser beams emitted from the optical head 22 toward the optical disk 51 at a constant light intensity for playback according to the light-intensity control signal. In a recording operation, the analog front end 20 changes the level of the light intensity control signal on the basis of data output from the signal processor 18. Thus, the analog front end 20 intermittently raises the light intensity of laser beams from a light intensity for playback to a light intensity for recording on the basis of data output from the signal processor 18.

Furthermore, the analog front end 20 amplifies the result of receiving returning light fed from the optical head 22 and performs calculation to generate a playback signal whose signal level changes in accordance with a pit sequence formed on the optical disk 51, and executes signal processing on the playback signal to generate playback data representing binary detection of the playback signal, and outputs the playback data to the signal processor 18. Furthermore, by the calculation, the analog front end 20 generates a tracking error signal whose signal level changes in accordance with the amount of tracking error, a focus error signal whose signal level changes in accordance with the amount of focus error, and so forth, and outputs these signals in the form of digital signals to the microcontroller 14.

The motor amp 21 drives mechanisms associated with the various types of driving signals fed from the signal processor 18. More specifically, the motor amp 21 rotates the spindle motor 23 and the sled motor 24 on the basis of the driving signal for spindle control and the driving signal for sled control. Furthermore, the motor amp 21 drives an actuator mounted on the optical head 22 on the basis of the driving signal for tracking control and the driving signal for focus control.

The spindle motor the spindle motor 23 chucks the optical disk 51 and rotates the optical disk 51 at a predetermined rotation rate. The sled motor 24 moves the optical head 22 in the radial direction of the optical disk 51.

The optical head 22 emits laser beams from an internal semiconductor laser (not shown) on the basis of the light-intensity control signal output from the analog front end 20, and condenses the laser beams on an information recording surface of the optical disk 51 via an objective lens (not shown). Furthermore, the optical head 22 leads light returning via the objective lens from the optical disk 51 irradiated with the laser beams to specific photoreceptors, and outputs results of detection by the photoreceptors to the analog front end 20. In the optical head 22, the objective lens can be moved by an actuator driven by the driving signal for tracking control and the driving signal for focus control, allowing tracking control and focus control. Furthermore, since the light intensity of the leaser beams is intermittently raised according to the light-intensity control signal, it is possible to raise temperature locally on the information recording surface of the optical disk 51 to record desired data.

The microcontroller 14 is a computer that executes various processes for controlling the overall operation of the recording and playback apparatus 1. The microcontroller 14 executes various processes by executing processing programs installed in advance on the recording and playback apparatus 1. The microcontroller 14 executes various processes on the basis of, for example, user's operations of an operation unit (not shown) or various signals detected by the analog front end 20. That is, the microcontroller 14 generates driving information regarding tracking control and focus control on the basis of a tracking-error signal and a focus-error signal detected by the analog front end 20, converts the driving information into analog signals, and outputs the analog signals to the motor amp 21. Thus, the microcontroller 14 exercises tracking control and focus control. Furthermore, the microcontroller 14 detects a position of laser-beam irradiation on the basis of header information detected by the header-information processor 17 generates driving information regarding sled control on the basis of the result of detection, outputs the driving information to the signal processor 18, so that processing such as seeking is executed on the basis of the driving information. Furthermore, the microcontroller 14 exercises spindle control in a similar manner.

The microcontroller 14 includes a random-value generator 41, a disk-identification-code calculator 42, and a RAM 43, and data can be exchanged among these components within the microcontroller 14. The random-number generator 41 generates random numbers. For example, the random-number generator 41 generates a random number each time a management table TV is recorded. The disk-identification-code calculator 42 calculates a disk identification code that serves to determine whether the recording and playback apparatus that performed last recording on the optical disk 51 is the self apparatus or a different apparatus. That is, the disk identification code is a code that indicates that data has been recorded on the optical disk 51 by the recording and playback apparatus 1. The disk identification code will be described later in detail with reference to FIG. 10. The RAM 43 stores data that is used as needed by the microcontroller 14 in executing various processes. The "self apparatus" refers to the recording and playback apparatus 1 itself. An apparatus that is not the recording and playback apparatus 1, even if the apparatus is of the same type with the same specification as the recording and playback apparatus 1, is considered as a different machine. Obviously, an apparatus not with the same specification as the recording and playback apparatus 1 is considered as a different machine.

Figure 2:
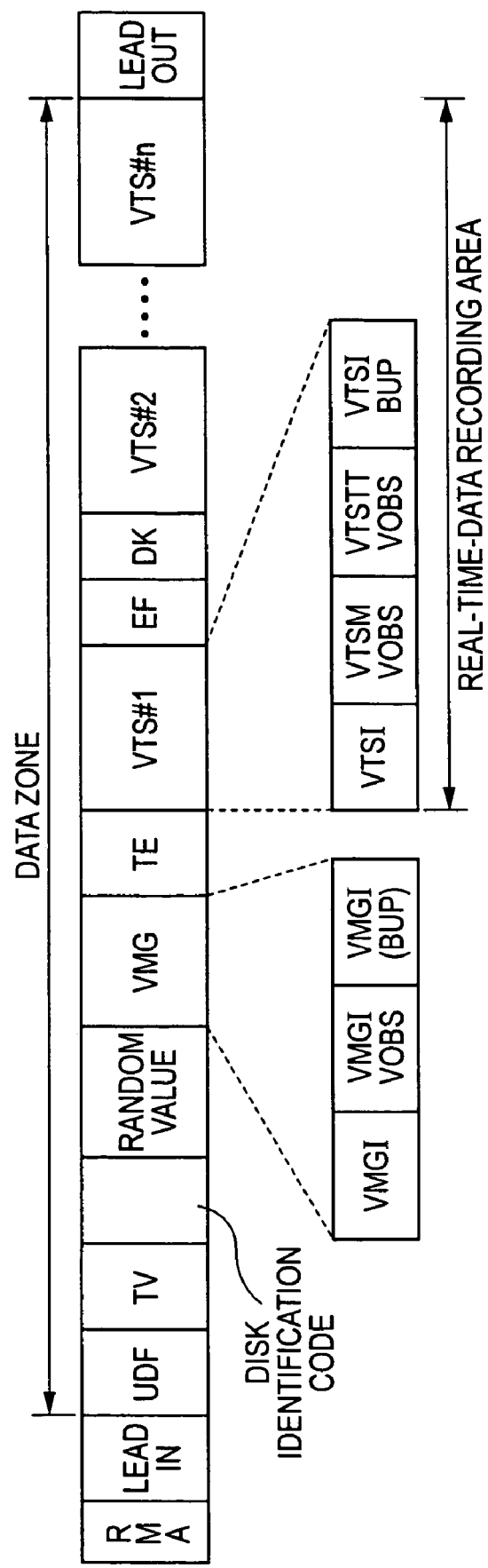
FIG. 2 is a diagram showing an example logical format of an optical disk.

FIG. 2 is a diagram showing an example of the logical format of the optical disk 51 according to the DVD video format. According to this format, the information recording surface the optical disk 51 is divided into a lead in, a data zone, and a lead out, in that order from the beginning on the inner side, and desired image data, audio data, or the like is recorded in the data zone.

The data zone is divided into a UDF (Universal Disk Format) area (file system area), a management table TV area (indicated as TV in the figures), a disk identification code area, a random number area, a VMG (Video Manager) area (DVD management information area), an extension-file guidance information TE area (indicated as TE in the figures), and a real-time-data recording area, in that order from the lead-in side. The UDF area, the management table TV area, the VMG area, and the extension-file guidance information TE area constitute a management-information recording area for managing a file of data recorded on the optical disk 51. The guidance information TE serves for management of the entire area where the extension file is recorded, and as described earlier, the recording position is defined in the management table in the RAM. More specifically, the guidance information TE whether data (not shown) included in the management table TV is recorded, and a start address and a size are defined.

In the VMG area, DVD management information, i.e., TOC information for managing the entire image data recorded in the real-time-data recording area, is recorded. The UDF area represents a system for file management by a computer. That is, in the UDF area, management information for managing the entire data recorded in the real-time-data recording area in a format compatible with the file system in the computer is recorded.

In the management table TV area, the management table TV for managing a program area of the optical disk 51 is recorded. More specifically, in the management table TV area, a start address and an end address of VTS recorded in the real-time-data recording area, the start address of the extension-file guidance information TE area, and so forth, are recorded. This area is assigned so that access thereto by a playback-only DVD playback apparatus (DVD player) is prohibited. The content of the management table TV is changed as needed when data on the optical disk 51 is added, deleted, or edited.

Furthermore, in the management table TV area, in addition to the management table TV, an area where data can be recorded freely (a free zone) is provided. In this embodiment, in the free zone provided in the management table TV area, a disk identification code for identifying the recording and playback apparatus that performed last recording on the optical disk 51, and a random number are recorded. The disk identification code is data indicating whether the recording and playback apparatus that performed last recording on the optical disk 51 is of the same machine type as the recording and playback apparatus 1 or of a different machine type. Furthermore, the disk identification code serves to determine whether the recording and playback apparatus that performed last recording on the optical disk 51 is the recording and playback apparatus 1 itself. In this embodiment, the disk identification code is generated on the basis of data in the management table TV, the random value, and VMGI of VMG on the DVD video format. The random value is generated by the recording and playback apparatus 1 each time the management table is updated. The recording and playback apparatus 1, after recording data on the optical disk 51 loaded thereon, writes a disk identification code and a random value to indicate that the data has been recorded by the recording and playback apparatus 1 itself. Thus, when the optical disk 51 is unloaded from the recording and playback apparatus 1 and is then loaded again on the recording and playback apparatus 1, by checking the disk identification code recorded in the free zone of the management table TV area, it is possible to determine whether the recording on the optical disk 51 was performed by the recording and playback apparatus 1 itself.

The real-time-data recording area is a program area where actual data is recorded. In the real-time-data recording area, image data is recorded by units of VTS (Video Title Set), and a still image file EF as an extension file or intermediate management information DK, or the like is recorded. The extension file EF and the intermediate management information DK serve to identify the position or the like of the extension file EF so that it is possible to play back the extension file EF.

The VMG includes, in order from the beginning, VMGI (Video Manager Information), VMGM VOBS (Video Object Set for VMG Menu), and VMGI BUP (Backup of VMGI). In the VMGI, control information regarding the entire video zone of the DVD is recorded. In the VMGM VOBS, information regarding a menu for selecting a title is recorded. In the VMGI BUP, information corresponding to the VMGI is recorded as a backup. The VTS includes, in order from the beginning, VTSI (Video Title Set Information), VTSM VOBS (Video Object Set for the VTSM), VTSTT VOBS (Video Object Set for Titles in a VTS), and VTSI BUP (Backup of VTSI). In this example, each VTS corresponds to a single title. In the VTSTT VOBS, actual image data in the MPEG2 format is recorded. In the VTSI, management information for managing the actual image data, such as recording position information, is recorded. In the VTSM VOBS, a title menu of video data is recorded. The VTSM VOBS is optional. VTSI BUP is a backup of the VTSI.

As for UDF, which is management information for computers, management information is recorded so that extension files can be recognized and accessed. On the other hand, as for VMG, which is management information for DVD playback, information regarding extension files is not recorded. As described above, in the case of an access by a computer, a desired file can be searched for and played back on the basis of UDF. In the case of an access by a DVD recording and playback apparatus, a desired moving-image file can be searched for and played back on the basis of VMG. UDF serves as management information for video data recorded on an optical disk in accordance with a file management system for computers. On the other hand, VMG serves as management information for moving-image data recorded on the optical disk 51 in a manner compatible with DVD recording and playback apparatuses. Recording of extension files does not affect playback of moving images, so that reliable playback based on the DVD video format can be achieved.

In this embodiment, data is written to the optical disk 51 by ROW (Restricted Over Write). ROW is used in overwritable optical disks. However, also in the case of ROW, video data is sequentially recorded when data is recorded in an unused area. In ROW, a padding area or the like is managed by an RMA (recording management area) provided in a region inner than the lead in. The procedure for recording on the optical disk 51 and the configuration areas other than the management table TV area in FIG. 2 (RMA, lead in, UDF, VMG, TE, VTS#1 to VTS#n (EF, DK), lead out) are the same as those described in Japanese Unexamined Patent Application Publication No. 2003-331563, so that detailed description thereof will be omitted. The procedure of recording data on the optical disk 51 is not limited to that described in Japanese Unexamined Patent Application Publication No. 2003-331563, and other recording procedures may be used.

Next, a recording and playback process by the recording and playback apparatus 1 shown in FIG. 1 will be described with reference to FIG. 3. This process is started when a user instructs power on of the recording and playback apparatus 1 via an operation unit (not shown).

When the user instructs power on of the recording and playback apparatus 1, in step S11, the recording and playback apparatus 1 is powered on. In step S12, the microcontroller 14 checks whether the optical disk 51 has been loaded on a drive (not shown) of the recording and playback apparatus 1 on the basis of results of detection by a detection mechanism (not shown) for the optical disk 51, and the process waits until the optical disk 51 is loaded on the drive of the recording and playback apparatus 1. When the recording and playback apparatus 1 is powered off while step S12 is repeated, the process proceeds to step S13.

When it is determined in step S12 that the optical disk 51 has been loaded, in step S13, the microcontroller 14 drives the sled motor 24 so that the optical head 22 is moved to the innermost track of the optical disk 51, and obtains results of playback of the innermost track via the signal processor 18, thereby obtaining management information for recording on and playback from the optical disk 51. More specifically, by obtaining the results of playback of the innermost track of the optical disk 51, the microcontroller 14 obtains VMG data when the optical disk 51 is finalized while obtaining RMA data when the optical disk 51 is not finalized. Furthermore, on the basis of the RMA information, when data has already been recorded in the real-time-data recording area of the optical disk 51, the microcontroller 14 searches the optical disk 51 to obtain VTSI and VTSTT VOBS information of each VTS. As described above, similarly to the case of an ordinary recording and playback apparatus for recording on and playback from DVDs, the microcontroller 14 obtains management information for recording on and playback from the optical disk 51. In the processing of step S13, the microcontroller 14 obtains UDF data as well as VMG data. Furthermore, during playback of the real-time-data recording area, when intermediate management information DK is recorded (FIG. 2), the microcontroller 14 also obtains the intermediate management information DK. Thus, the microcontroller 14 also obtains management information for an extension file not defined in the DVD video format so that the extension file can be played back from the optical disk 51. The microcontroller 14 records and holds the pieces of management information thus obtained in the RAM 43 (FIG. 1).

More specifically, the microcontroller 14 drives the sled motor 24 via the signal processor 18 and the motor amp 21 to move the optical head 22 toward the inner side of the optical disk 51. The optical head 22 irradiates the optical disk 51 with laser beams, and lights returning from the optical head 22 are sequentially processed by the analog front end 20 and the microcontroller 14. The optical head 22 is controlled through the processing by the microcontroller 14 via the signal processor 18 and the motor amp 21, whereby processing for tracking control and focus control is executed. Furthermore, the signal processor 18 processes the results of light detection to play back data recorded on the optical disk 51. In the recording and playback apparatus 1, through the series of steps described above, the microcontroller 14 obtains various information recorded on the inner side of the optical disk 51, which is stored in an internal memory of the microcontroller 14. The procedures of various playback processes are the same as the procedure described above, so that descriptions thereof will be omitted.

In step S11, the recording and playback apparatus 1 executes a self-recording checking process. In the self-recording checking process, it is checked on the basis of a disk identification code (FIG. 2) recorded in the disk-identification-code area whether last recording on the optical disk 51 was performed by the self apparatus. This process will be described later in detail with reference to FIGS. 7 and 8. When no data has been recorded on the optical disk 51 yet, step S14 is skipped.

In step S15, the microcontroller 14 determines whether unloading of the optical disk 51 has been instructed by the user. More specifically, the microcontroller 14 determines whether ejection of the optical disk 51 has been instructed by the user. When it is determined in step S15 that unloading of the optical disk 51 has been instructed, the process proceeds to step S20, which will be described later.

When it is determined in step S15 that unloading of the optical disk 51 has not been instructed, the process proceeds to step S16, in which the microcontroller 14 determines whether recording has been instructed by the user. More specifically, the microcontroller 14 determines whether recording or playback has been instructed by the user via an operation unit (not shown). When it is determined in step S15 that recording has been instructed, the process proceeds to step S17, in which the recording and playback apparatus 1 executes a recording process. The recording process will be described later in detail with reference to FIG. 11.

When it is determined in step S16 that recording has not been instructed, i.e., when it is determined that playback has been instructed, the process proceeds to step S18, in which the recording and playback apparatus 1 executes a playback process. More specifically, when the playback instruction by the user relates to playback of a moving image, on the basis of management information stored in an internal memory (the RAM 43 shown in FIG. 1) (the management information obtained in step S13), the microcontroller 14 controls the overall operation so that the file of the moving image associated with the playback instruction will be played back. The playback process will be described later in detail with reference to FIG. 12. The playback process is continued until it is instructed to stop playback. When the user instructs that playback be stopped, the microcontroller 14 exercises control so that the playback operation is stopped.

After step S17 or step S18, the process proceeds to step S19, in which the microcontroller 14 determines that power off has been instructed by the user. When it is determined that power off has not been instructed by the user, the process proceeds to step S15, and subsequent steps are repeated.

When it is determined in step S15 that unloading of the optical disk 51 has been instructed, the process proceeds to step S20, in which the microcontroller 14 records the management table TV on the optical disk 51. More specifically, the microcontroller 14 records the management table TV stored in the internal RAM 43 on the optical disk 51.

In step S21, the recording and playback apparatus 1 executes a disk-identification-code recording process. More specifically, the recording and playback apparatus 1 generates a random value, applies a hash function program on the random value generated, the management table TV, and VMGI data to calculate a disk identification code indicating that data has been recorded on the optical disk 51 by the recording and playback apparatus 1, and records the disk identification code as shown in FIG. 2. Furthermore, the recording and playback apparatus 1 records the random value generated as shown in FIG. 2. Thus, when the optical disk 51 is loaded again on the recording and playback apparatus 1, it is possible to execute the self-recording checking process in step S14. The self-recording checking process will be described later with reference to FIG. 14.

In step S22, the optical disk 51 instructs a loading mechanism (not shown) to eject the optical disk 51, whereby the optical disk 51 is ejected. After step S22, the process returns to step S12, and subsequent steps are repeated. That is, the process waits until an optical disk is loaded again.

When it is determined in step S19 that power off has been instructed, the process proceeds to step S23, in which the microcontroller 14 powers off the recording and playback apparatus 1. The process is then exited.

Next, an example configuration of data recorded in the management table TV area (FIG. 2) will be described.

In the management table TV area, the management table TV, the disk identification code, and the random number are recorded. More specifically, the management table TV is recorded in the management table TV area, and the disk identification code and the random value are recorded in the free zone of the management table TV. The management table TV is stored in the RAM 43 (FIG. 1) as needed in the process described above with reference to FIG. 3, and is updated by the process in step S20. The disk identification code and the random number are updated by the disk-identification-code recording process in step S21.

FIG. 4 is a diagram showing a simple example configuration of the management table TV. Referring to FIG. 4, the management table TV includes the number of titles (the number of VTSs), the start addresses of the respective VTSs, and the start and end addresses of a plurality of chapters included in each title. In the example shown in FIG. 4, the number of titles (VTSs) is two, and the start addresses of the respective titles, namely, "VTS#1" and "VTS#1", are included. Furthermore, in the example shown in FIG. 4, VTS#1 includes 10 chapters and the start and end addresses of the respective 10 chapters. VTS#2 includes 20 chapters and the start and end addresses of the respective 20 chapters. The management table TV additionally includes various information, such as the start address of the extension-file guidance information TE area, which is omitted herein.

Figure 3:
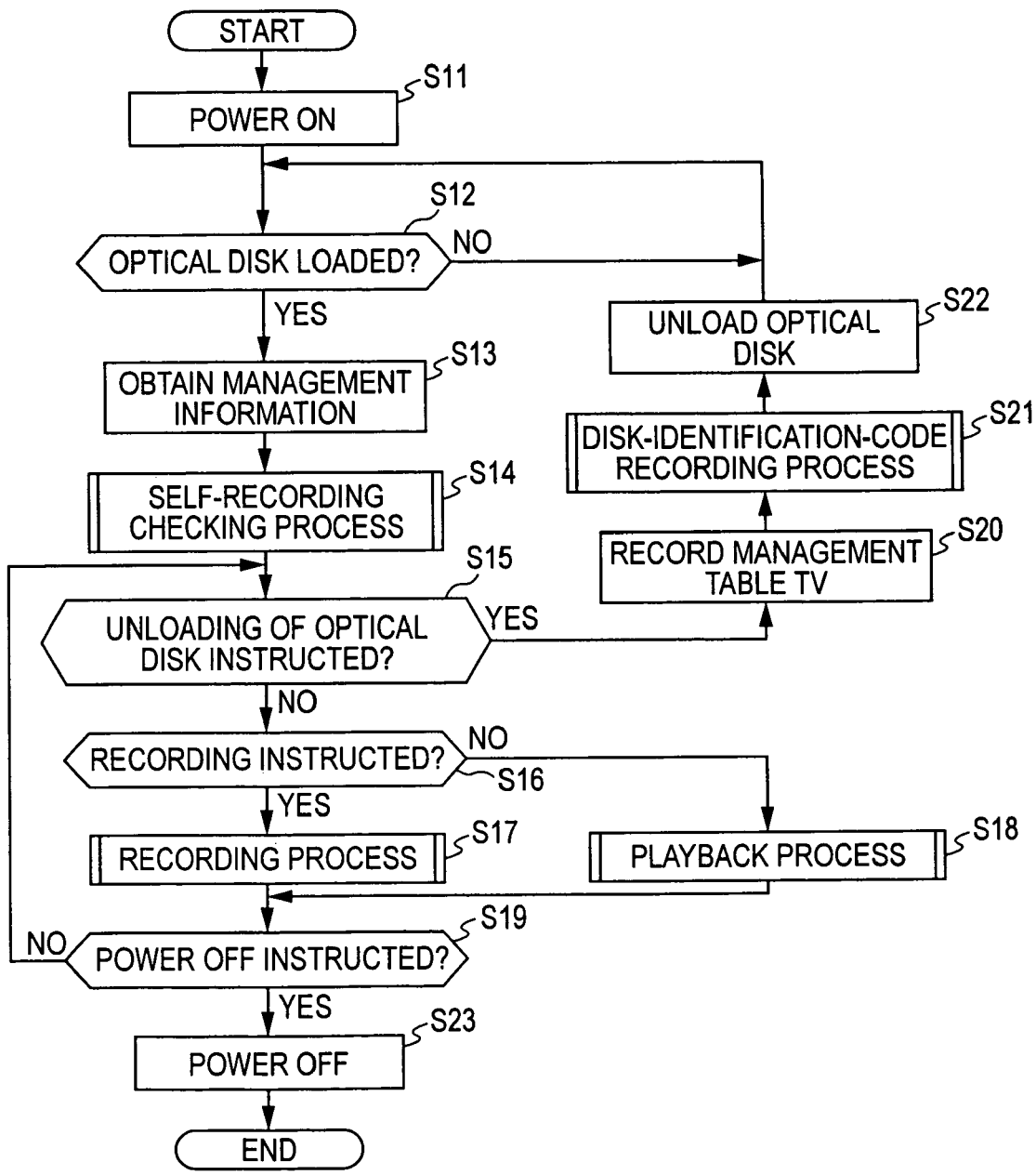
FIG. 3 is a flowchart of a recording and playback process executed by the recording and playback apparatus shown in FIG. 1.
Figure 5:
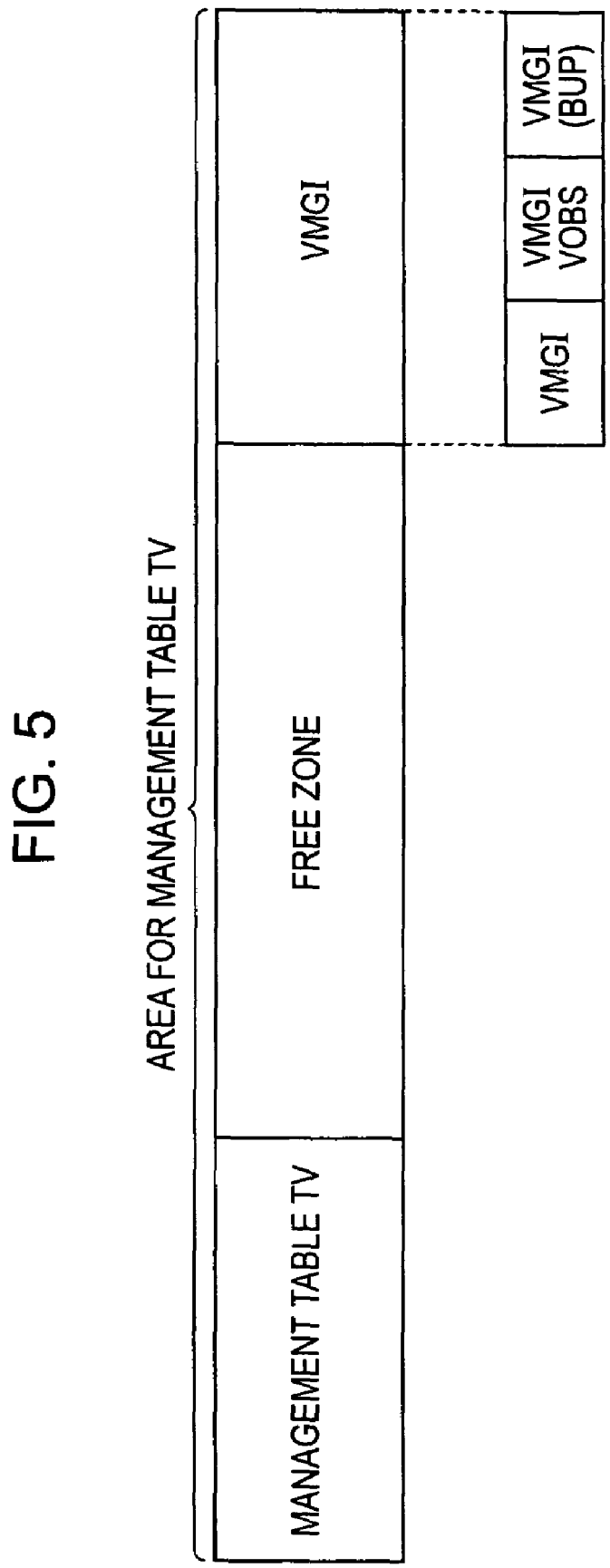
FIG. 5 is a diagram showing data stored in a management table TV area.

FIG. 5 shows an example of data stored in the management table TV area after the recording process in step S17 shown in FIG. 3 is finished.

Referring to FIG. 5, in the management table TV area, the management table TV is recorded, and the remaining area is a free zone. In the disk-identification-code recording process of step S21, on the basis of the management table TV, the random value, and VMGI of VMG shown in FIG. 5, the microcontroller 14 generates and records the disk identification code shown in FIG. 6, and records the random number stored in the internal memory (the RAM 43 shown in FIG. 1). As described above, when unloading of the optical disk 51 is instructed (when step S15 results in YES), the disk identification code and the random value are recorded in the management table TV area.

Next, the self-recording checking process of step S14 shown in FIG. 3 will be described in detail with reference to flowcharts shown in FIGS. 7 and 8.

In step S51, the microcontroller 14 checks whether the management table TV is present in the management table TV area of the optical disk 51. For example, the microcontroller 14 drives the sled motor 24 so that the optical head 22 is moved to the innermost track of the optical disk 51, and obtains the result of playback of the innermost track via the signal processor 18, thereby determining whether the management table TV is recorded on the optical disk 51. In a recording operation by the recording and playback apparatus 1, when data is updated, the management table TV is also updated. Thus, the absence of the management table TV indicates that the recording and playback apparatus that performed last recording on the optical disk 51 is different from the recording and playback apparatus 1. That is, when the management table TV is absent, it is determined that data was recorded on the optical disk 51 by an apparatus of a different machine type from the recording and playback apparatus 1.

Figure 6:
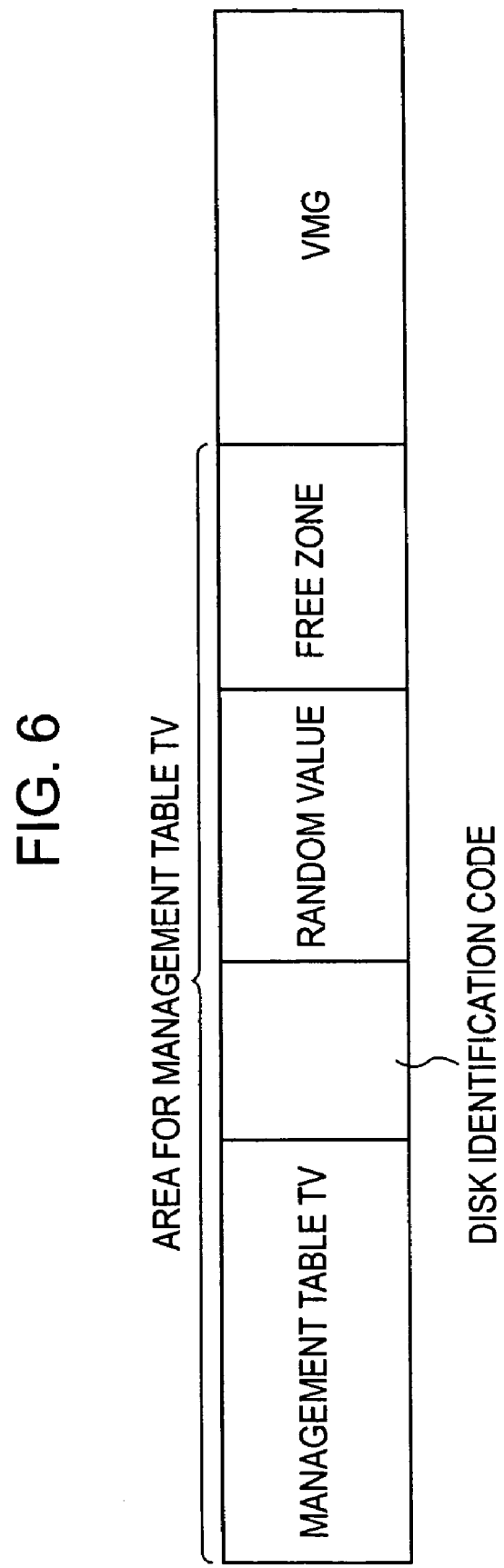
FIG. 6 is a diagram showing data recorded in the management table TV area.

When it is determined in step S51 that the management table TV is present, the process proceeds to step S52, in which the microcontroller 14 checks whether the disk identification code is present in the management table TV area. For example, when the disk identification code is recorded in the management table TV area as shown in FIG. 6, step S52 results in YES. When the optical disk 51 is unloaded from the recording and playback apparatus 1, as described earlier, the disk identification code and the random value are recorded in the management table TV in step S21 shown in FIG. 3. Thus, when the disk identification code is absent, it is determined that the apparatus that performed last recording on the optical disk 51 is of a different machine type from the recording and playback apparatus 1.

When it is determined in step S52 that the disk identification code is present, the process proceeds to step S53, in which the microcontroller 14 reads the disk identification code from the management table TV area of the optical disk 51. In the example shown in FIG. 14, the microcontroller 14 reads the disk identification code from the area for the management table TV.

In step S54, the microcontroller 14 reads the management table TV, the random value, and VMGI (refer to FIG. 2 or FIG. 6) from the management table TV area and the VMG area of the optical disk 51.

Figure 9:
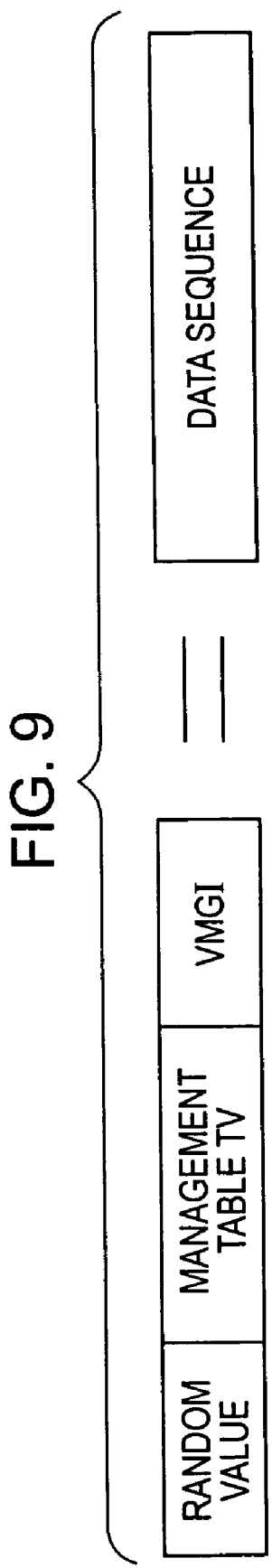
FIG. 9 is a diagram showing a data sequence.

In step S55, the microcontroller 14 concatenates the management table TV, the random value, and the VMGI into a continuous data sequence. More specifically, the microcontroller 14 concatenates the management table TV, the random value, and the VMGI of VMG, shown in FIG. 6, into a continuous data sequence, as shown in FIG. 9. That is, the microcontroller 14 combines the management table TV, the random value, and the VMGI into a single piece of data. In the example shown in FIG. 9, the management table TV is attached after the random value and VMGI further after, the order is not limited to that order (as long as the order is predefined).

Figure 10:
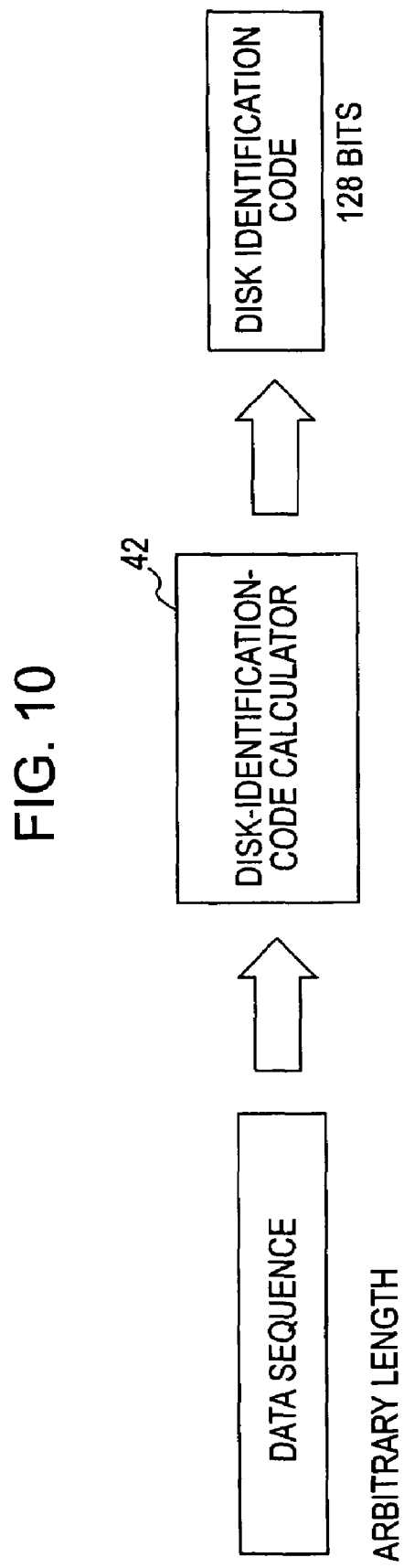
FIG. 10 is a diagram for explaining how a disk identification code is generated.

In step S56, the disk-identification-code calculator 42 of the microcontroller 14 calculates a hash value of the data sequence generated in step S55, the hash value being a "disk identification code'". More specifically, the disk-identification-code calculator 42 applies a hash function program on the data sequence composed of the random value, the management table TV, and the VMGI as shown in FIG. 10 to calculate a hash value that is used as a disk identification code. The hash unction may be a program of MD (Message Digest) 5. The hash function program calculates a hash value of a fixed length (e.g., 128 bits) for data of an arbitrary data length. Furthermore, it is not possible to calculate an input data sequence (a data sequence composed of the management table TV, the VMGI, and the random value) from a hash value calculated by the hash function program (i.e., the function is not reversible). Furthermore, the probabilities of occurrence of output values are uniform over the range of possible output values.

In step S57, the microcontroller 14 checks whether the disk identification code read from the optical disk 51 in step S53 coincides with the "disk identification code'" calculated in step S56. The disk identification code read from the optical disk 51 in step S53 is a disk identification code that is recorded when last recording is performed by an apparatus of the same machine type as the recording and playback apparatus 1 and the optical disk 51 is unloaded. When the last recording on the optical disk 51 was performed by a recording and playback apparatus of the same machine type as the recording and playback apparatus 1, the disk identification code recorded on the optical disk 51 coincides with the "disk identification code'" calculated in step S55.

When it is determined in step S57 that the disk identification code read from the optical disk 51 does not coincide with the disk identification code' calculated, when it is determined in step S51 that the management table TV is absent, or when it is determined in step S52 that the disk identification code is absent, it is determined that the apparatus that performed last recording on the optical disk 51 is a recording and playback of a machine type that is different from the machine type of the recording and playback apparatus 1. Then, the process proceeds to step S58.

In step S58, the microcontroller 14 determines that recording on the optical disk 51 was performed by an apparatus of a different machine type. For example, let it be assumed that in the first recording process, recording was performed by the recording and playback apparatus 1 (the own machine type) and a disk identification code and a random number were recorded, and in the second recording process, recording was performed by another recording and playback apparatus (a different machine type). Then, the disk identification and the random number are not updated. Thus, when the optical disk 51 is loaded again on the recording and playback apparatus 1 (the own machine type) in the third recording process, the "disk identification code'" calculated on the basis of the management table TV, the random number, and the VMGI differs from the disk identification code recorded on the optical disk 51 in the first recording process, since at least one of the management table TV, the random value, and the VMGI differs from those after the first recording process due to the recording by an apparatus of a different machine type in the second recording process. In this manner, it is possible to quickly determine whether last recording on the optical disk 51 was performed by an apparatus of the same machine type or an apparatus of a different machine type. After step S58, the process is exited.

When it is determined in step S57 that the disk identification code read from the optical disk 51 coincides with the disk identification code' calculated, the process proceeds to step S59, in which the microcontroller 14 checks whether the disk identification code is stored in the flash memory 26. As will be described later in detail, when a disk identification code is recorded on the optical disk 51, the same disk identification code is stored in the flash memory 26 (shown in the right part of FIG. 15). That is, since the disk identification code is recorded when the optical disk 51 is unloaded (step S21 shown in FIG. 3), the disk identification code is stored in the flash memory 26 at a timing of unloading of the optical disk 51. Furthermore, in the flash memory 26, thumbnail images generated based on image data recorded on the optical disk 51 are cached under the control of the microcontroller 14, and disk identification codes are stored in association with the cached thumbnail images.

When it is determined in step S59 that the disk identification code is not stored in the flash memory 26, the process proceeds to step S60, in which the microcontroller 14 determines that recording on the optical disk 51 was performed by another apparatus of the same machine type. That is, the microcontroller 14 determines that recording on the optical disk 51 was performed by an apparatus that is not the recording and playback apparatus 1 but that is of the same machine type as the recording and playback apparatus 1. For example, when a playback process was performed by the recording and playback apparatus 1, a thumbnail image generated in the playback process should be stored in the flash memory 26 together with an associated disk identification code. When it is determined in step S59 that the disk identification code is not stored in the flash memory 26, it is indicated that last recording was performed by a recording and playback apparatus that is not the recording and playback apparatus 1 but that is of the same machine type. After step S60, the process is exited.

When it is determined in step S59 that the disk identification code is stored in the flash memory 26, the process proceeds to step S61, in which the microcontroller 14 determines that recording on the optical disk 51 was self-recording. That is, the microcontroller 14 determines that last recording on the optical disk 51 was performed by the recording and playback apparatus 1 itself.

In step S62, the microcontroller 14 searches for data for which the disk identification code of the optical disk 51 that is loaded coincides with the disk identification code of the data cached in the flash memory 26. For example, since the flash memory 26 stores thumbnail data generated in a playback operation in association with a disk identification code that is generated after updating of the management table TV, the microcontroller 14 searches for data (e.g., thumbnail image data) associated with the disk identification code calculated in step S56, on the basis of the data cached in the flash memory 26.

In step S63, the microcontroller 14 uses, as needed, the data (e.g., thumbnail image data) for which the disk identification code' calculated coincides with the disk identification code stored in the flash memory 26. Then, the process is exited.

Figure 8:
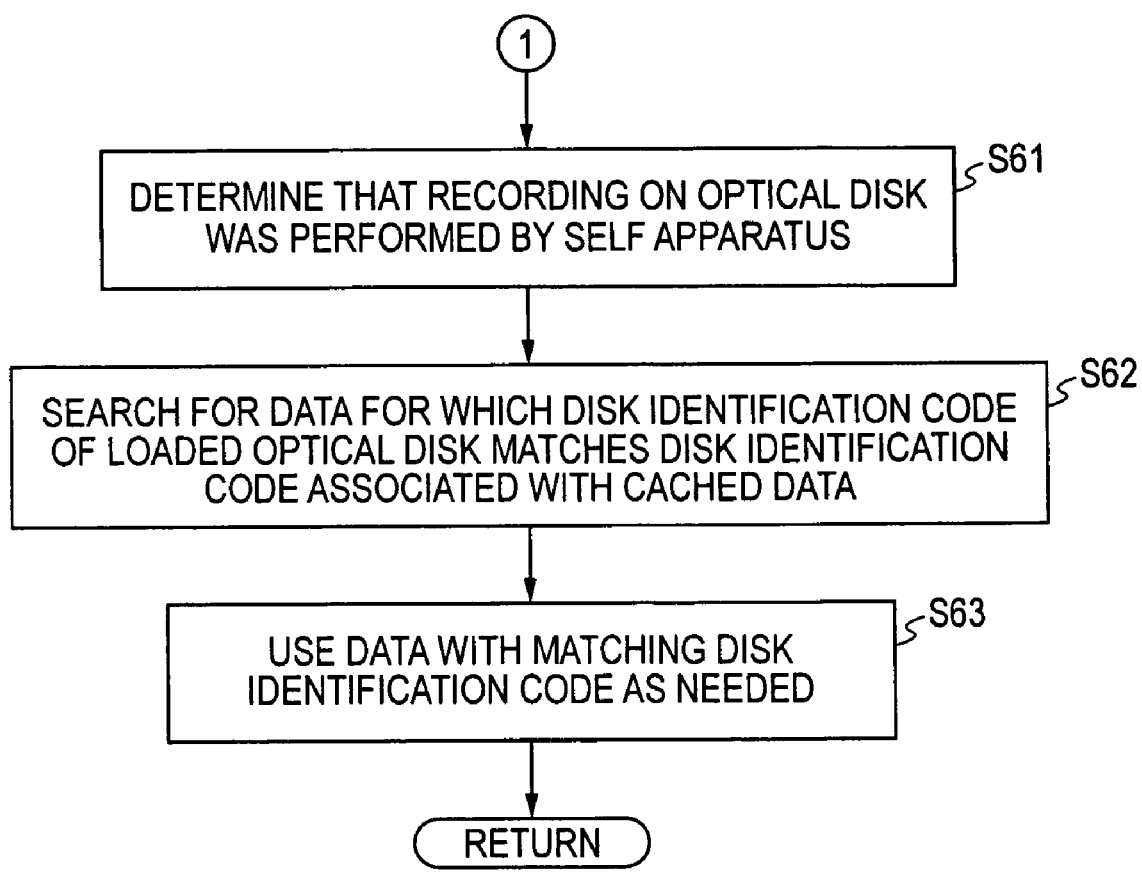
FIG. 8 is a flowchart of the self-recording checking process.

By the processes shown in FIGS. 7 and 8, it is possible to quickly determine whether last recording on the optical disk 51 was performed by an apparatus of the same machine type or an apparatus of a different machine type. Furthermore, it is possible to quickly determine whether last recording on the optical disk 51 was performed by the apparatus itself. Furthermore, when last recording on the optical disk 51 was performed by the apparatus itself, cached data associated with the disk identification code can be used as needed.

More specifically, when steps S51, step S52, and step S57 shown in FIG. 7 result in NO, it is determined that last recording on the optical disk 51 was performed by an apparatus of a different machine type (not of the same type). When step S59 results in NO, it is determined that last recording on the optical disk 51 was performed by an apparatus that is not the recording and playback apparatus 1 itself but that is of the same machine type as the recording and playback apparatus 1. When step S51, step S52, step S57, and step S59 all result in YES, it is determined that last recording on the optical disk 51 was performed by the recording and playback apparatus 1 itself, so that cached data can be used as needed.

As described above, it is possible to determine whether last recording on the optical disk 51 was performed by an apparatus of the same machine type as the recording and playback apparatus 1 or by an apparatus of a different machine type. Furthermore, it is possible to determine whether last recording on the optical disk 51 was performed by the recording and playback apparatus 1 or by another apparatus.

Next, the recording process of step S17 shown in FIG. 3 will be described in detail with reference to a flowchart shown in FIG. 11.

In step S81, the microcontroller 14 determines whether to execute finalizing on the optical disk 51. For example, the microcontroller 14 determines whether the user has instructed a finalizing process via the operation unit (not shown). The finalizing process is a process of updating the UDF, VMG, lead in, lead out, and so forth, shown in FIG. 2, to finish the recording process.

When it is determined in step S81 that the finalization process has not been instructed, the process proceeds to step S82, in which the image-data input unit 11 and the audio-data input unit 12 accept input of data to be recorded. For example, image data and audio data captured by an imager and a microphone or the like (not shown) is accepted.

In step S82, the microcontroller 14 controls relevant parts to convert the input data into recording data in accordance with a recording format. For example the microcontroller 14 controls the compander 13 (the image processor 31 and the audio processor 32) to compress the image data and the audio data and to multiplex the compressed image data and audio data by time division, and controls the header-information processor 17 to add header information that is unique to the optical disk 51, header information regarding an extension file, and so forth. Furthermore, the microcontroller 14 controls the signal processor 18 to add an error correcting code to the time-division-multiplexed data with the header information attached and to then execute interleaving and encoding. In this manner, the input data is converted into recording data.

In step S83, the microcontroller 14 records the recording data on the optical disk 51. More specifically, according to the recording data, the analog front end 20 raises the light intensity of laser beams emitted from the optical head 22 toward the optical disk 51, so that a pit sequence is formed on the optical disk 51, whereby the moving-image data is recorded. At this time, the microcontroller 14 updates the data of the management table TV stored in the internal memory (the RAM 43) as needed, and also updates the management table TV in the management table TV area of the optical disk 51 (FIG. 6).

In step S85, the microcontroller 14 determines whether to finish recording on the basis of an operation of the operation unit (not shown) by the user. When it is determined not to finish recording, the process returns to step S82, and subsequent steps are repeated. That is, the process of accepting input of data to be recorded and recording recording data on the optical disk 51 is repeated until it is instructed to finish recording.

When it is determined in step S85 to finish recording, the process proceeds to step S86, in which the microcontroller 14 finishes recording. At this time, if data to be recorded in step S82 and subsequent steps is a moving image, in step S86, recording of VTSTT VOBS is finished when recording of actual data is finished, and then VTSI BUP, VTSI, and VTSM VOBS are sequentially recorded, whereby recording of a single VTS is finished. As described above, in the recording and playback apparatus 1, when the user instructs that recording be stopped, the series of processing by the compander 13 and so forth is stopped under the control of the microcontroller 14 so that recording of image data is stopped, and then management information for the file of the moving image that has been recorded is recorded on the optical disk 51. That is, in the recording and playback apparatus 1, management information is generated by the microcontroller 14 on the basis of position information of the moving image, information of the file size, and information of the recording date or the like, and the management information is output to the signal processor 18 and recorded on the optical disk 51 subsequently to the image data, whereby the area of VTSI BUP is formed. Then, an area for forming VTSI and VTSM VOBS for a next VTS is allocated by padding, seeking is performed to move the optical head 22 to the area allocated for VTSI and VTSM VOBS, and similar management information is output to the signal processor 18 and recorded in the area on the optical disk 51, whereby the area for VTSI and VTSM VOBS is formed. In the recording and playback apparatus 1, a single title of moving-image data is recorded in the manner described above. Thus, in the recording and playback apparatus 1, when a file of moving image is recorded, management information and the file are recorded according to the DVD video format, in which VTSI management information, VTSM VOBS management information, the file, and VTSI BUP management information are arranged continuously. In the recording and playback apparatus 1, when the user subsequently instructs recording of a moving image, each title is recorded on the optical disk 51 by repeating the same process.

When data to be recorded in step S82 and subsequent steps is a still image, still-image data obtained at a certain timing is recorded. Then, in step S87, an extension file of the still-image data is recorded, and intermediate management information DK and so forth are recorded. More specifically, when the optical disk 51 is a virgin disk, still-image data input from the image-data input unit 11 is compressed by the image processor 31 of the compander 13 according to the JPEG standard, and the compressed data is recorded. In the recording and playback apparatus 1, when a moving image is recorded, an area for VTSI and VTSM VOBS is first allocated and then actual data is recorded. On the other hand, when a still image is recorded, returning to the beginning of an area allocated by padding, actual data of the still image is recorded without allocating such an area. When the user instructs recording of a subsequent still image, the still image is similarly recorded on the optical disk 51. On each occasion of recording, the recording position or the like of the file is recorded on the memory.

In the recording and playback apparatus 1, when the user records a desired number of files of still images on the optical disk 51 and then instructs that recording be stopped, for example, by switching the operation mode, management information for the files, such as the recording positions, stored on the memory, is recorded in a subsequent area as intermediate management information DK that is used temporarily until finalizing. Thus, in the recording and playback apparatus 1, when a file of data that is not a moving image is recorded, the file and associated management information are recorded in that order, and the recording format of the file and the management information is changed in accordance with the properties of the file recorded.

In the recording and playback apparatus 1, such intermediate management information (FIG. 2) for a plurality of files recorded continuously is integrated to record management information for overall management, individual information representing the beginning and filename of each file is recorded, and the start address of the intermediate management information DK is recorded in a fixed area on the inner side of the optical disk 51 as extension-file guidance information TE. Furthermore, information representing the recording position of the extension-file guidance information is recorded in the management table TV.

Thus, when the recording and playback apparatus 1 supports files other than files of moving images, it is also possible to play back still-image files. That is, when the optical disk 51 is loaded, the recording and playback apparatus 1 searches the optical disk 51 with reference to the management table TV to play back intermediate management information DK of a still-image file as well as VTS and VTSM VOBS data and store the information in the memory of the microcontroller 14. Thus, for example it is possible to present the user with the titles of moving images and still images recorded on the optical disk 51 according to instructions by the user. Furthermore, when the user instructs playback of a moving image, it is possible to play back the corresponding moving-image file on the basis of VTS and VTSM VOBS data similarly to the case of read-only optical disk described earlier.

When it is determined in step S81 to execute finalizing, the process proceeds to step S87, in which the microcontroller 14 generates UDF and VMG data. More specifically, the microcontroller 14 supplies the management information obtained from the optical disk 51 on the basis of the management table TV and stored in the internal memory, the management information generated by recording of moving images and still images and stored in the memory, and the intermediate management information to the header-information processor 17 so that the header-information processor 17 generates UDF data for computers. Furthermore, the microcontroller 14 supplies management information for moving-image files to the header-information processor 17 so that the header-information processor 17 generates VMG data for DVD players.

In step S88, the microcontroller 14 controls relevant parts to record the UDF and VMG data generated on the optical disk 51. The UDF and VMG data is recorded on an area allocated on the inner side of the optical disk 51, and a lead in and a lead out are also formed. Thus, the data recorded on the optical disk 51 can be played back by a DVD player supporting only the ordinary DVD format. After step S86 or step S88, the process is exited.

Figure 11:
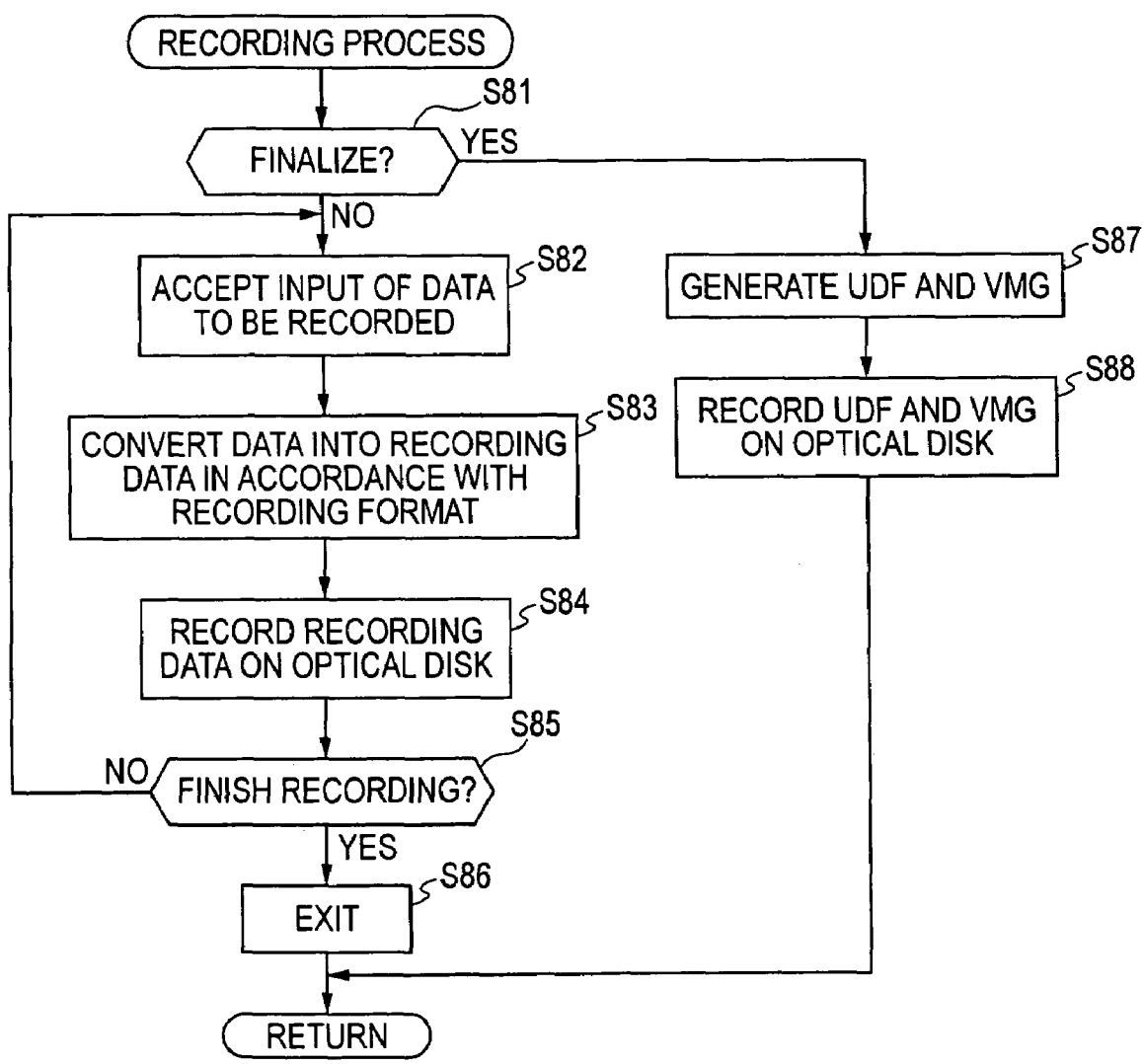
FIG. 11 is a flowchart of a recording process.

By the process shown in FIG. 11, data is recorded on the optical disk 51. When finalizing is executed, data recorded on the optical disk 51 can be played back by a DVD player supporting only the ordinary DVD format. Furthermore, it is possible to play back an extension file recorded on the optical disk 51.

Next, the playback process of step S18 in FIG. 3 will be described in detail with reference to a flowchart shown in FIG. 12.

In step S111, the microcontroller 14 determines whether a playback instruction by the user is an instruction for playing back a moving-image file. When it is determined that playback of a moving-image file is instructed, the process proceeds to step S112, in which the microcontroller 14 determines whether to display thumbnail images according to an instruction by the user. For example, when the user instructs that thumbnail images be displayed for selecting a moving image to be played back, it is determined that thumbnail images be displayed. On the other hand, for example when the user instructs a moving-image file to be played back without displaying thumbnail images, the process proceeds to step S119.

When it is determined in step S112 to display thumbnail images, the process proceeds to step S113, in which the microcontroller 14 determines whether thumbnail images that can be used exist. In this case, when it is determined in step S59 described earlier with reference to FIG. 7 that a disk identification code is cached in the flash memory 26, data with the matching disk identification code, retrieved in step S62 shown in FIG. 8, can be used. In the example shown in FIG. 12, the data with the matching disk identification code is used as a thumbnail image. That is, step S113 results in YES when data retrieved in step S62 shown in FIG. 8 exists.

When it is determined in step S113 that thumbnail images that can be used exist, the process proceeds to step S114, in which the microcontroller 14 reads thumbnail images cached in the flash memory 26. The thumbnail images are generated by a process described later with reference to FIG. 12.

When it is determined in step S113 that thumbnail images that can be used do not exist, the process proceeds to step S115, in which the microcontroller 14 reads the corresponding image data from the optical disk 51. More specifically, the microcontroller 14 reads the corresponding image data (i.e., image data used for generating the thumbnail images) on the basis of VMG data with reference to the management information stored in the RAM 43.

In step S116, the image processor 31 of the compander 13, under the control of the microcontroller 14, generates thumbnail images on the basis of the image data read in step S115.

After step S114 or step S116, the process proceeds to step S117, in which the output unit 25 displays the thumbnail images under the control of the microcontroller 14. For example, the display of the output unit 25, under the control of the microcontroller 14, displays the thumbnail images read in step S114 or the thumbnail images generated in step S116. At this time, when the thumbnail images have been stored in the flash memory 26, i.e., when self-recording is determined in the processes described earlier with reference to FIGS. 7 and 8, thumbnail images need not be generated again, and the data stored in the flash memory 26 can be used, so that the thumbnail images can be displayed quickly and the step of generating thumbnail images can be skipped. For example, thumbnail images shown in FIG. 13 are displayed.

Figure 13:
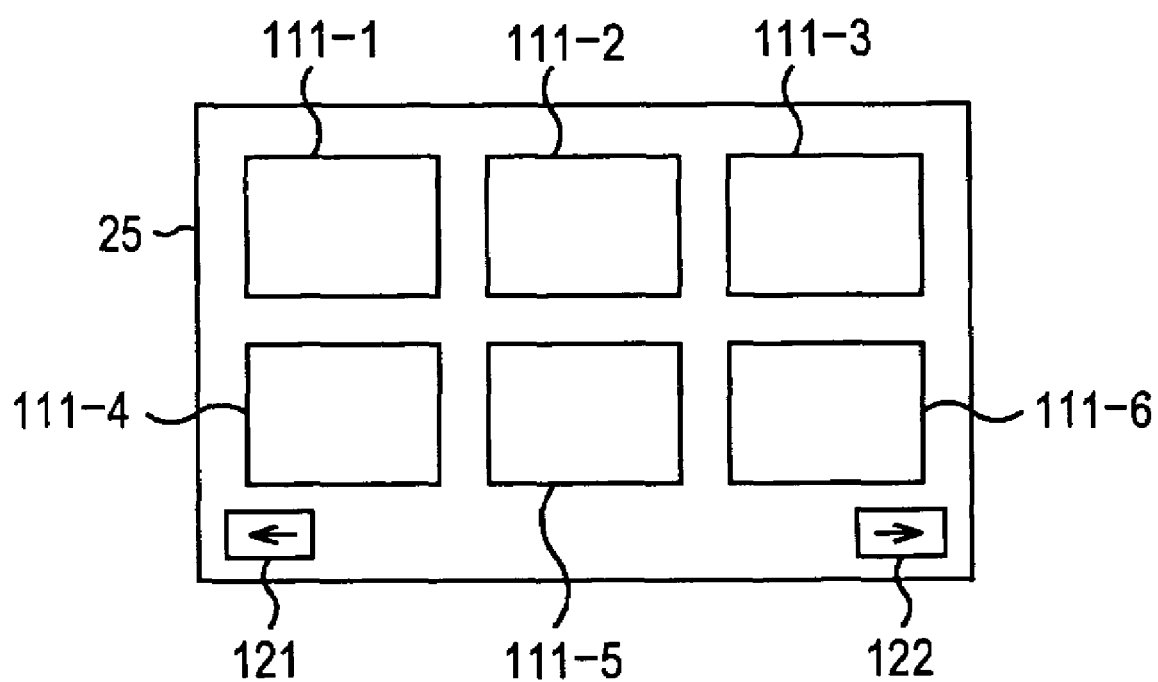
FIG. 13 is a diagram showing an example screen displaying thumbnail images.

In the example shown in FIG. 13, on the display of the output unit 25, six thumbnail images 111-1 to 111-6, an arrow 121 directed to the left, and an arrow 122 directed to the right are displayed. The arrow 121 is used to select a screen (showing six thumbnail images) that is previous to the screen displayed on the output unit 25. The arrow 122 is used to select a screen (showing six thumbnail images) that is subsequent to the screen displayed on the output unit 25.

As described above, in step S116, the image processor 31 generates thumbnail images respectively on the basis of the beginning (although need not necessarily be the beginning) of six moving-image files, and displays the thumbnail images on the output unit 25 in step S117. When it is determined in step S113 that thumbnail images that can be used are stored in the flash memory 26, six thumbnail images stored in the flash memory 26 are read in step S114 and displayed on the output unit 25 in step S117. The user selects a moving-image file to be played back with reference to the plurality of thumbnail images as shown in FIG. 13. Although six thumbnail images are displayed in the example shown in FIG. 13, the number of thumbnail images displayed is not limited to six. Furthermore, for example, when the arrow 121 or the arrow 122 is displayed, if corresponding thumbnail images are stored in the flash memory 26, the thumbnail images stored in the flash memory 26 are read and displayed. When corresponding thumbnail images are not stored in the flash memory 26, thumbnail images are generated and displayed. As described above, steps S113 to S118 are repeated as needed according to instructions by the user.

In step S118, the microcontroller 14 caches the thumbnail images displayed in step S117. That is, the microcontroller 14 stores the thumbnail images read or generated in the flash memory 26 (refer to the field of data relating to the optical disk 51, described later with reference to FIG. 15). Thus, when it is instructed to display the same thumbnail images next time, the thumbnail images stored in the flash memory 26 can be displayed. When step S113 results in YES, thumbnail images to be displayed are already stored in the flash memory 26, so that the thumbnail images need not be stored in the flash memory 26 again. However, since thumbnail images are deleted as needed as will be described later with reference to FIG. 18, the thumbnail images may be updated.

When it is determined in step S112 not to display thumbnail images, or after step S118, the process proceeds to step S119, in which the microcontroller 14 reads data of a moving-image file that is to be played back according to an instruction by the user.

In step S120, the output unit 25, under the control of the microcontroller 14, displays a moving image on the basis of the data of the moving-image file.

When it is determined in step S111 that the file to be played back according to the instruction by the user is not a moving-image file (e.g., when the file is an extension file), the process proceeds to step S121, in which the microcontroller 14 reads data of the file to be played back. For example, the microcontroller 14 detects the recording position of a corresponding file on the basis of UDF data stored in the RAM 43, and instructs relevant parts of the recording and playback apparatus 1 to read data from the recording position. When the optical disk 51 is not finalized, the microcontroller 14 detects the recording position of a corresponding file on the basis of the management table, the guidance information, and the associated intermediate management information stored in the RAM 43, and instructs relevant parts of the recording and playback apparatus 1 to read data from the recording position.

In step S122, the output unit 25, under the control of the microcontroller 14, displays a still image on the basis of the data read (the data of the still-image file).

After step S120 or step S122, the process proceeds to step S123, in which the microcontroller 14 determines whether to finish playback according to an instruction by the user. When it is determined not to finish playback, the process returns to step S111, and subsequent steps are repeated. That is, the playback process is repeated until an instruction for finishing playback is input by the user.

When it is determined in step S123 to finish playback, the process proceeds to step S124, in which the microcontroller 14 controls relevant parts to finish playback. Then, the process is exited.

The playback process is executed as described above with reference to FIG. 12. Furthermore, when it is determined by the processes shown in FIGS. 7 and 8 that last recording on the optical disk 51 was performed by the recording and playback apparatus 1 itself, data (thumbnail images) associated on the basis of disk identification codes can be used, so that the step of generating thumbnail images can be skipped.

Although thumbnail image data is cached in the flash memory 26 in this embodiment, without limitation, other data (certain data recorded on the optical disk 51) that can be read from the optical disk 51 and processed may be used.

Next, the disk-identification-code recording process of step S21 shown in FIG. 3 will be described in detail with reference to a flowchart shown in FIG. 14.

In step S141, the disk-identification-code calculator 42 of the microcontroller 14 reads VMGI and currently effective management table TV. More specifically, the disk-identification-code calculator 42 of the microcontroller 14 reads VMGI of VMG shown in FIG. 5 and data of the management table TV stored in, for example, the RAM 43 of the microcontroller 14 (or data of the management table TV read from the optical disk 51). The data of the effective management table TV that is read at this time is data of the latest management table TV.

In step S142, the random-number generator 41 of the microcontroller 14 generates a random value. The number of bits of the random value generated at this time is not particularly limited.

In step S143, the disk-identification-code calculator 42 of the microcontroller 14 concatenates the random value generated in step S142 and the management table TV and VMGI read in step S141 into a data sequence. More specifically, the disk-identification-code calculator 42 concatenates the random value, the management table TV, and the VMGI data into a data sequence as shown in FIG. 9.

In step S144, the disk-identification-code calculator 42 of the microcontroller 14 calculates a hash value of the data sequence, the hash value being used as a disk identification code. For example, as shown in FIG. 10, the disk-identification-code calculator 42 applies a hash function program on the data sequence composed of the random number, the management table TV, and the VMGI to calculate a hash value, and uses the result as a disk identification code. Although the length of the data sequence is arbitrary, the disk identification code calculated by the hash function program has a fixed length.

In step S145, the microcontroller 14 stores data relating to the optical disk 51 loaded and the disk identification code calculated in association with each other in the flash memory 26. In this embodiment, thumbnail images are used as the data relating to the optical disk 51 loaded. That is, the microcontroller 14 stores thumbnail images generated in the playback process described earlier with reference to FIG. 12 and stored in the flash memory 26 and the disk identification code calculated in step S144 in association with each other in the flash memory 26. When the disk identification calculated is a disk identification code A, for example the microcontroller 14 stores data shown in the left part of FIG. 15 in the flash memory 26.

In the example shown in FIG. 15, thumbnail images 111-1 to 111-6 are associated with the disk identification code A. The thumbnail images 111-1 to 111-6 are stored in the flash memory 26 in step S118 described earlier with reference to FIG. 12. Furthermore, the respective thumbnail images 111-1 to 111-6 are associated with their dates of last use and usage frequencies. In the example shown in FIG. 15, for all the thumbnail images 111-1 to 111-6, the date of last use is 2004 Oct. 15, and the usage frequency is 2. The date of last usage and the usage frequency are used, for example, when data stored in the flash memory 26 is deleted. This process will be described later in detail with reference to FIGS. 17 and 18.

In step S146, the microcontroller 14 stores the disk identification code in the flash memory 26. More specifically, as shown in the right part of FIG. 15, the microcontroller 14 stores the disk identification code A calculated in step S144 in the flash memory 26. The disk identification code stored in the flash memory 26 at this time is used in step S59 described earlier with reference to FIG. 7.

By steps S145 and S146, the data shown in FIG. 15 is stored in the flash memory 26.

In step S147, the microcontroller 14 writes the disk identification code calculated in step S144 and the random number generated in step S142 by the random-number generator 41 in the free zone of the management table TV area. More specifically, the microcontroller 14 writes the disk identification code and the random value in the free zone of the area for the management table TV shown in FIG. 5. Thus, the disk identification code and the random value are recorded in the management table TV area as shown in FIG. 6. After step S147, the process is exited.

Figure 14:
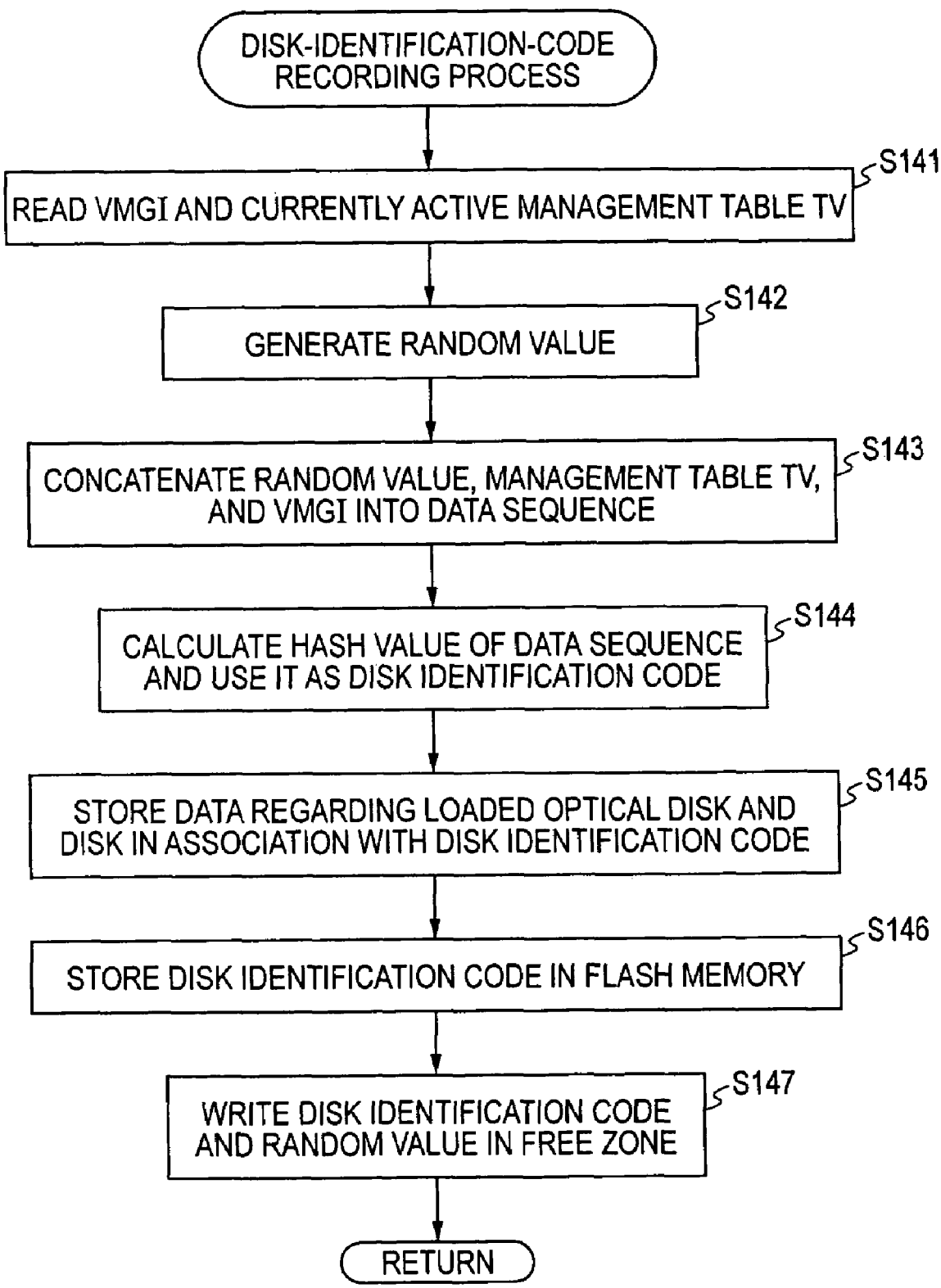
FIG. 14 is a flowchart of a disk-identification-code recording process.

By the process shown in FIG. 14, when the optical disk 51 is unloaded from the recording and playback apparatus 1, a random number is generated, a disk identification code is calculated on the random value generated, the VMGI, and the management table TV, and the disk identification code is recorded on the optical disk 51. Furthermore, the random value generated by the recording and playback apparatus 1 is recorded. Thus, when the optical disk 51 is loaded again on the recording and playback apparatus 1 (i.e., when step S12 described earlier with reference to FIG. 3 results in YES), it is possible to determine whether last recording on the optical disk 51 was performed by the recording and playback apparatus 1 itself using the disk identification code cached in the flash memory 26. Furthermore, when last recording on the optical disk 51 was performed by the recording and playback apparatus 1 itself, it is possible to execute various processes quickly (e.g., thumbnail images can be displayed without re-generating the thumbnail images) using data relating to the optical disk 51, stored in the flash memory 26.

Furthermore, since a random value is generated in the process shown in FIG. 14, even when the recording and playback apparatus 1 and another recording and playback apparatus of the same machine type generates disk identification codes using the same management table TV and VMGI accidentally at the same timing, the values of random numbers generated differ. Thus, whether last recording was self-recording can be determined more reliably.

Figure 16:
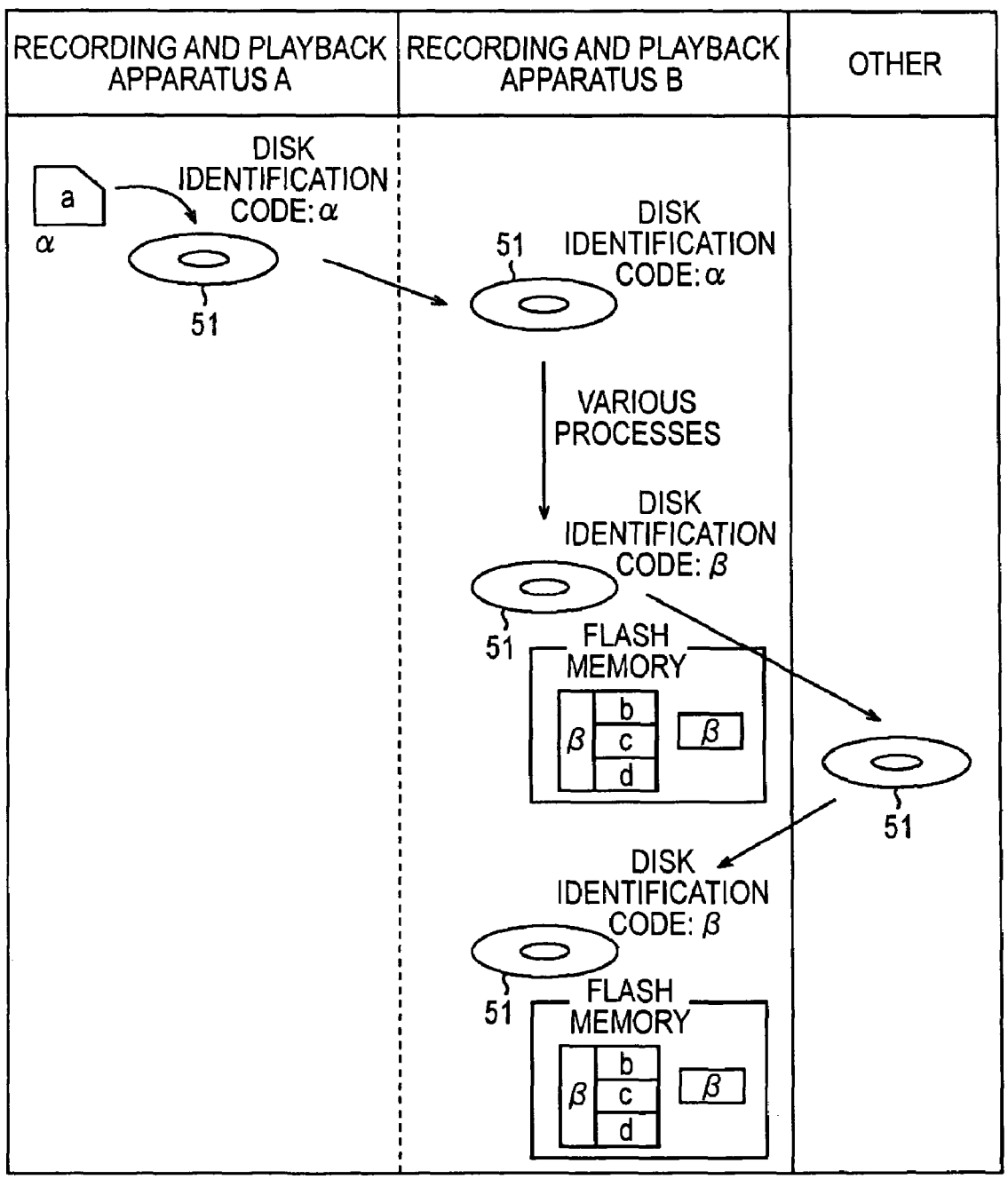
FIG. 16 is a diagram for explaining an example of using data stored in the flash memory.

Next, a specific example of the recording process and the playback process executed using the process described above will be described with reference to FIG. 16.

A recording and playback apparatus A and a recording and playback apparatus B have the same functions as the recording and playback apparatus 1 shown in FIG. 1.

When unloading of the optical disk 51 is instructed (e.g., when step S15 shown in FIG. 3 results in YES) after data a is recorded by the recording and playback apparatus A (e.g., after step S17 shown in FIG. 3), a disk identification code α is generated and recorded (e.g., in step S21 shown in FIG. 3). More specifically, the recording and playback apparatus A generates a random value, and calculates a disk identification code α by applying a hash function program on a data sequence composed of the random value generated, the VMGI, and the effective management table TV.

Then, when the optical disk 51 is loaded on the recording and playback apparatus B, the recording and playback apparatus B executes the self-recording checking process (e.g., step S14 shown in FIG. 3). In this case, since last recording on the optical disk 51 was performed by the recording and playback apparatus A, it is determined that last recording was not self-recording. Then, various processes are executed in the recording and playback apparatus B so that data (thumbnail image data) relating to the optical disk 51, namely, data b, data c, and data d, is stored in the flash memory 26 of the recording and playback apparatus B (e.g., step S18 shown in FIG. 3). Then, when unloading of the optical disk 51 is instructed (e.g., when step S15 shown in FIG. 3 results in YES), a disk identification code β is generated and recorded (e.g., step S21 shown in FIG. 3). More specifically, the recording and playback apparatus B generates a random value, and calculates a disk identification code β by applying a hash function program on a data sequence composed of the random value generated, the VMGI, and the management table TV.

Figure 12:
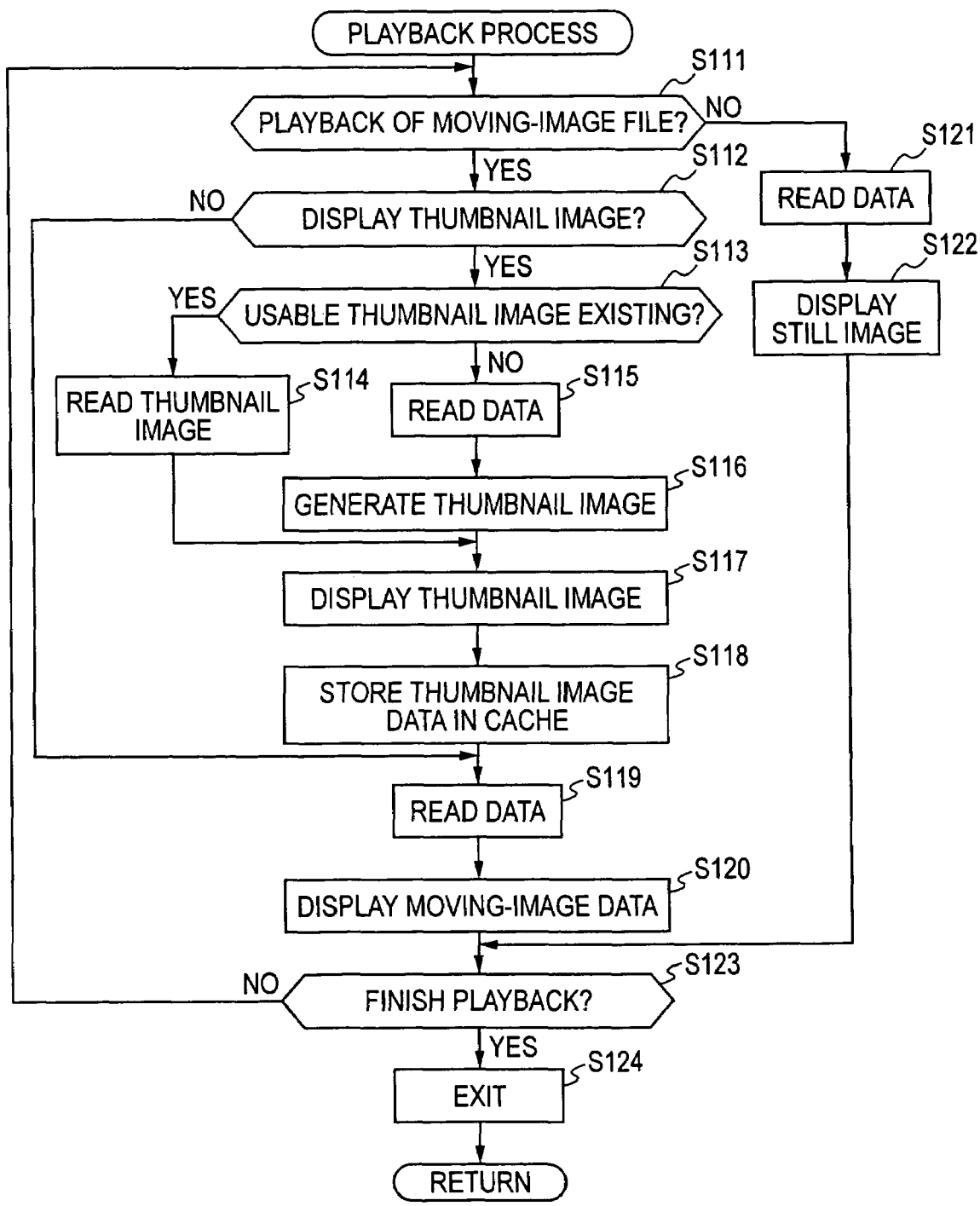
FIG. 12 is a flowchart of a playback process.

Furthermore, when the optical disk 51 is unloaded and then loaded again on the recording and playback apparatus B without any recording process performed on the optical disk 51 (a playback process does not matter), the recording and playback apparatus B executes the self-recording checking process (e.g., step S14 shown in FIG. 3). In this case, since last recording on the optical disk 51 was performed by the recording and playback apparatus B itself, it is determined that last recording was self-recording. More specifically, it is determined that the disk identification code' calculated using the management table TV, the random value, and the VMGI recorded on the optical disk 51 coincides with the disk identification code recorded on the optical disk 51, and also with the disk identification code stored in the flash memory 26, so that it is determined that last recording was self-recording. Then, when various processes are executed in the recording and playback apparatus B, the data (thumbnail image data)

relating to the optical disk 51, stored in the flash memory 26 and associated with the disk identification code β, namely, the data b, the data c, and the data d, is used (e.g., step S114 and step S117 shown in FIG. 12). For example, when the thumbnail data b is displayed on the recording and playback apparatus B, the thumbnail image data b need not be generated again, and the data b stored in the flash memory 26 is used for display. As described above, data stored in the flash memory 26 can be used when disk identification codes match. Thus, playback (display of thumbnail images) from the optical disk 51 can be executed quickly, and the load of processing for the optical disk 51 can be reduced.

By repeating the process described above, the amount of data stored in the flash memory 26 can become large. Thus, processes described below with reference to FIGS. 17 and 18 may be executed as needed.

Figure 17:
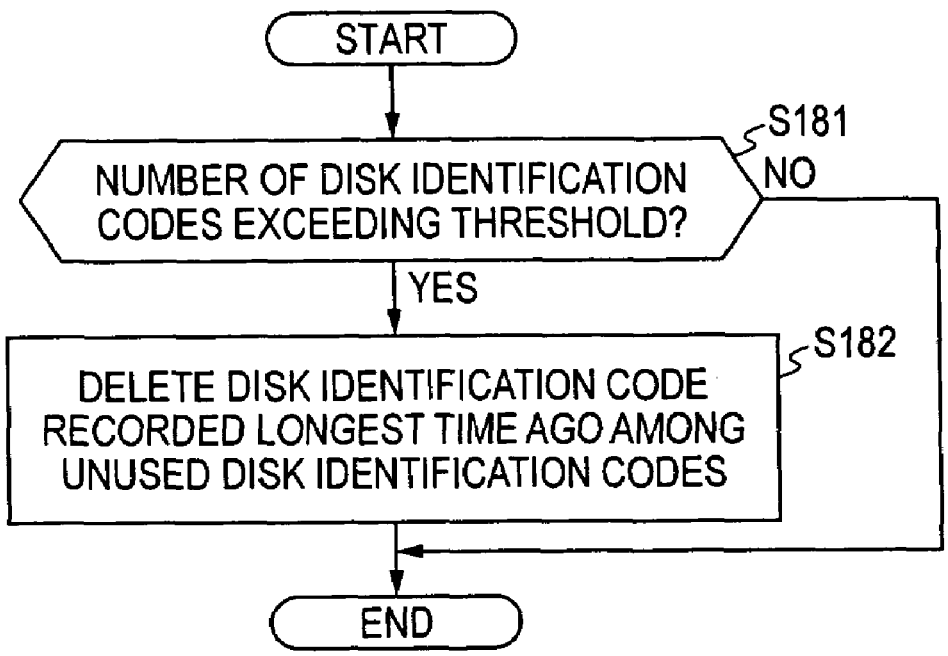
FIG. 17 is a flowchart of a disk-identification-code deleting process.

FIG. 17 is a flowchart of a disk-identification-code deleting process. This process is executed, for example, in an interval of the processes described above (i.e., when processing load is small).

In step S181, the microcontroller 14 checks whether the number of disk identification codes stored in the flash memory 26 exceeds a predetermined threshold. For example, when the threshold is 10, the microcontroller 14 checks whether the number of disk identification codes stored in the flash memory 26 exceeds 10. In the example shown in FIG. 15, this checking is performed on the basis of the number of disk identification codes shown in the right part.

When it is determined in step S181 that the number of disk identification codes exceeds the threshold, the process proceeds to step S182, in which the microcontroller 14 deletes a disk identification code that was recorded at an oldest time from the flash memory 26 among disk identification codes that are not used. For example, when 11 disk identification codes are stored in the flash memory 26 and the threshold is 10, the microcontroller 14 deletes a disk identification code that was recorded at an oldest time among the disk identification codes stored in the flash memory 26. For example, the microcontroller 14 determines the disk identification code to be deleted on the basis of the dates of last use of the thumbnail image 111-1 associated with the disk identification code, shown in the left part of FIG. 15. Alternatively, the date of recording may be associated with the disk identification code itself shown in the right part of FIG. 15, and the microcontroller 14 may determine a disk identification code to be deleted based on the date of recording.

When it is determined in step S181 that the number of disk identification codes does not exceed the threshold, or after step S182, the process is exited.

By the process shown in FIG. 17, when the number of disk identification codes exceeds the threshold, an old disk identification code is deleted. Thus, increase in the amount of data stored in the flash memory 26 is restricted, so that the capacity of the flash memory 26 can be saved.

Figure 18:
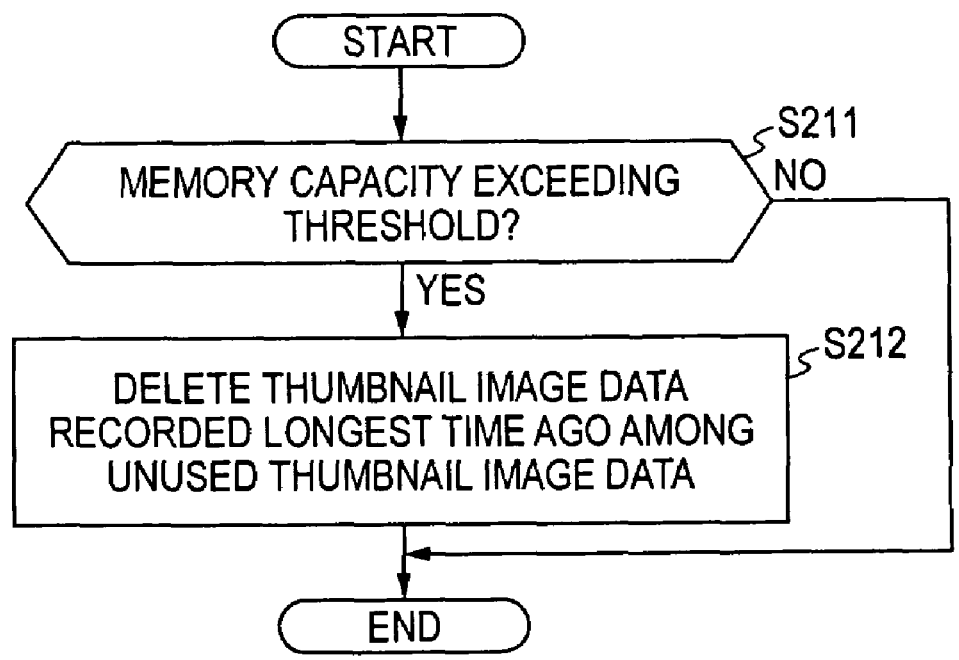
FIG. 18 is a flowchart of a thumbnail-image-data deleting process.

FIG. 18 is a flowchart of a thumbnail-image-data deleting process. This process is executed in an interval of the processes described earlier (i.e., when processing load is small), similarly to the process shown in FIG. 17.

In step S211, the microcontroller 14 determines whether the amount of data stored in the flash memory 26 exceeds a predetermined threshold. For example, 80% of the capacity of the flash memory 26 is used as the threshold, and it is determined that the threshold is exceeded when the amount of data stored in the flash memory 26 exceeds 80% of the capacity of the flash memory 26.

When it is determined in step S211 that the amount of data exceeds the threshold, the process proceeds to step S212, in which the microcontroller 14 deletes thumbnail image data that was recorded at an oldest time (or that is least recently used) from the flash memory 26 among thumbnail image data that is not used. For example, the microcontroller 14 deletes thumbnail images that was recorded most previously until the threshold is no longer exceeded, on the basis of the dates of last use (refer to the left part of FIG. 15) the thumbnail images stored in the flash memory 26. For example, the microcontroller 14 deletes six thumbnail images stored in the flash memory 26. In determining thumbnail images to be deleted, usage frequency or the like may be considered.

When it is determined in step S211 that the amount of data does not exceed the threshold, or after step S212, the process is exited.

By the process shown in FIG. 18, when the amount of data exceeds the threshold, thumbnail image data (data relating to the optical disk 51) that is not used is deleted. Thus, increase in the amount of data stored in the flash memory 26 is restricted, so that the capacity of the flash memory 26 can be saved. As described above, in the recording and playback apparatus 1, cache data that is not used can be deleted at an appropriate timing.

As described above, in the recording and playback apparatus 1 for the removable optical disk 51, when data is recorded on the optical disk 51, a disk identification code indicating that the data has been written by the recording and playback apparatus 1 itself is additionally recorded. Thus, it is possible to quickly determine whether last recording on the optical disk 51 loaded was performed by the recording and playback apparatus 1 itself or by an apparatus of a different machine type.

Furthermore, even when data is written on the single optical disk 51 by apparatuses of a plurality of machine types, with reference to the disk identification code, it is possible to quickly determine whether last recording on the optical disk 51 was performed by an apparatus of the same machine type as the recording and playback apparatus 1 or an apparatus of a different machine type.

Furthermore, since the disk identification code is cached in the flash memory 26 of the recording and playback apparatus 1, it is possible to determine whether last recording on the optical disk 51 was performed by the recording and playback apparatus 1 it self as well as whether last recording on the optical disk 51 was performed by an apparatus of the same machine type as the recording and playback apparatus 1.

Furthermore, since data relating to the optical disk 51 is cached in the flash memory 26 in association with a disk identification code, when a matching disk identification code is found for the optical disk 51 (i.e., when the disk identification code is effective), data relating to the optical disk 51, cached in the flash memory 26, can be used so that playback from the optical disk 51 can be executed quickly. Furthermore, by using thumbnail images cached in the flash memory 26, the thumbnail images can be presented to the user quickly.

Furthermore, when the disk-identification-code calculator 42 generates a disk identification code, the amount of information is reduced using a hash function. Thus, the amount of information of the disk identification code is smaller than that of an input value (the amount of information of a random number, the management table TV, and VMGI in this embodiment). Furthermore, since the disk identification code is calculated using a hash function, the length of an area for storing the disk identification code can be fixed. Furthermore, since an input value (data sequence) for the hash function is generated on the basis of a part of data recorded on the optical disk 51, the possibility of incorrect decision in the self-recording checking process can be reduced.

At this time, the random-number generator 41 generates a random number, and the random number is used to calculate the disk identification code. Thus, even when recording apparatuses of the same machine type start and finish recording at the same timings so that the contents of VMGI and the management table TV accidentally coincide, using random numbers of different values, the possibility of incorrect recognition of the disk identification code can be further reduced. That is, even when data of the management table TV and data of VMGI are the same, different disk identification codes can be generated using different random values.

Furthermore, it is possible to quickly determine whether last recording on the optical disk 51 was performed by the recording and playback apparatus 1 itself or by another apparatus.

Furthermore, in the case of self-recording, data relating to the optical disk 51, stored in the flash memory 26, can be used, so that processing for the optical disk 51 can be executed quickly.

The example described above is summarized below.

In the recording and playback apparatus 1, when unloading of the optical disk 51 is instructed (when step S15 shown in FIG. 3 results in YES) after recording of data on the optical disk 51 is finished (after step S17 shown in FIG. 3), a random number is generated, a disk identification code is generated on the basis of the random number generated, data of the management table TV, and data of VMGI of VMG, the disk identification code and the random value are recorded in the free zone of the management table TV area of the optical disk 51, and then the optical disk 51 is unloaded. For example, the recording and playback apparatus 1 generates a disk identification code by calculating a hash value of a data sequence composed of a random value, data of the management table TV of the optical disk 51, and data of VMGI of VMG. When the optical disk 51 after the recording operation is loaded again on the recording and playback apparatus 1 (e.g., when step S12 shown in FIG. 3 results in YES), the recording and playback apparatus 1 determines whether last recording on the optical disk 51 loaded was performed by the recording and playback apparatus 1 itself, on the basis of the data of the management table TV area of the optical disk 51 (step S14 shown in FIG. 3). More specifically, the recording and playback apparatus 1 generates a "disk identification code'" by calculating a hash value of a data sequence composed of a random value, data of the management table TV, and data of VMGI of VMG of the optical disk 51, and determines that last recording (or editing) on the optical disk 51 was performed by the recording and playback apparatus 1 itself when the "disk identification code'" calculated coincides with the disk identification code recorded in the management table TV area of the optical disk 51 and also with the disk identification code stored in the flash memory 26 of the recording and playback apparatus 1.

At this time, when the optical disk 51 is unloaded after the recording and playback apparatus 1 (e.g., the recording and playback apparatus A) records the disk identification code in the free zone of the management table TV area of the optical disk 51 in the first recording process (or deleting or editing process) and a recording and playback apparatus of a different machine type (e.g., the recording and playback apparatus B) does not rewrite the free zone of the management table TV area (i.e., the disk identification code and the random value) in the second recording process (or deleting or editing process), even if the area other than the data of the management table TV in the management table TV area, i.e., the free zone shown in FIG. 5, does not change, the content of at least one of the management table TV and VMGI changes. That is, only the content of the management table TV changes, only the content of VMGI changes, or the contents of both the management table TV and VMGI change. Thus, when the optical disk 51 is loaded again on the recording and playback apparatus 1 (the recording and playback apparatus A), in the recording and playback apparatus 1 (the recording and playback apparatus A), the "disk identification code'" calculated from the random number, the management table TV, and the VMGI of the optical disk 51 at the time of unloading from the recording and playback apparatus B (the disk identification code calculated in step S56) differs from the disk identification code recorded in the free zone of the management table TV area (the disk identification code read in step S53). Thus, the recording and playback apparatus 1 (the recording and playback apparatus A) determines that last recording on the optical disk 51 was performed by an apparatus of a different machine type.

Furthermore, when the recording and playback apparatus B is configured so that the content of the management table TV of the optical disk 51 is updated, when addition, deletion, editing, or the like is performed on data on the optical disk 51, the content of the management table TV changes. Thus, in this embodiment, a disk identification code is generate and recorded on the basis of the content of the management table TV, and VMGI and a random value in the DVD video format, so that accidental matching (incorrect decision) of disk identification codes can be prevented.

On the other hand, when the recording and playback apparatus B of a different machine type rewrites the free zone of the management table TV area (i.e., the disk identification code and the random number) in the second recording process (or deleting or editing process), the disk identification code written by the recording and playback apparatus 1 (the recording and playback apparatus A) in the first recording process is lost. Thus, when the optical disk 51 is loaded again on the recording and playback apparatus 1 (the recording and playback apparatus A) after the second recording process, the recording and playback apparatus 1 (the recording and playback apparatus A) determines that the disk identification code is absent (step S52 shown in FIG. 7 results in NO), and determines that last recording on the optical disk 51 loaded was performed by an apparatus of a different machine type (step S58).

When the recording and playback apparatus B is configured not to update the content of the management table TV, the management table TV is absent on the optical disk 51, or the management table TV is not updated and the content thereof remains as it was when the optical disk 51 was unloaded from the recording and playback apparatus 1 (the recording and playback apparatus A). When the management table TV is absent on the optical disk 51, it can be readily determined that recording on the optical disk 51 was performed by an apparatus of a different machine type (step S51). Furthermore, even when the management table TV is not updated by the recording and playback apparatus B, since the content of VMGI is updated by the recording and playback apparatus B, the disk identification code calculated from the random value, the management table TV, and the VMGI differs from the disk identification code recorded in the free zone of the management table TV area. Thus, the recording and playback apparatus 1 (the recording and playback apparatus A) can determine that last recording on the optical disk 51 was performed by an apparatus of a different machine type.

Although a random number is written to the optical disk 51 at the timing of step S147 shown in FIG. 14 in this embodiment, without limitation, a random number may be written to the optical disk 51 when the management table TV is updated (e.g., in step S20 shown in FIG. 3).

According to the embodiment described above, even when data recorded by an apparatus of an own machine type and data recorded by an apparatus of a different machine type coexist on the optical disk 51, it is possible to readily determine whether last recording on the optical disk 51 was performed by an apparatus of an own machine type and data recorded by an apparatus of a different machine type. Furthermore, by using a disk identification code stored in the flash memory 26, it is possible to readily determine whether last recording on the optical disk 51 was performed by the recording and playback apparatus 1 itself. Furthermore, when last recording on the optical disk 51 was performed by the recording and playback apparatus 1 itself, processing can be executed using data relating to the optical disk 51, stored in the flash memory 26.

When the random number, the management table TV, and the VMGI data themselves are recorded in the free zone of the management table TV area, the amount of data exceeds the capacity of the free zone. Thus, instead of recording the random number, the management table TV, and the VMGI data themselves, the random number, the management table TV, and the VMGI data are compressed using a hash program, so that the compressed data (a disk identification code) can be recorded in the free zone of the management table TV area.

The recording and playback apparatus 1 uses a hash function program to generate a disk identification code. Thus, a larger amount of information can be included in the disk identification code. For example, the hash function program may be applied on the entire data (data in the entire real-time-data recording area) recorded on the optical disk 51. Since a larger amount of information can be used in a data sequence for generating a disk identification code, the possibility of accidental matching of disk identification codes before and after editing (e.g., recording after deleting) of data on the optical disk 51 can be reduced.

Although the disk-identification-code calculator 42 uses a hash function program in this embodiment, other functions may be used. Although the hash function is irreversible, the function used may be either reversible or irreversible. Although other function programs for compressing an input value (a data sequence of the management table TV and VMGI and a random value) may be used, considering use of free areas and reserved areas of an existing format of the optical disk 51, the result of compression is preferably fixed-length data. That is, a disk identification code is preferably calculated by applying a function that yields an amount of data smaller than data (which changes on each recording) to which the function is applied. For example, the amount of data may be reduced by a predetermined function using subtraction or decimation. As described above, a disk identification code indicating that data has been recorded on the optical disk 51 by the recording and playback apparatus 1 is calculated by applying a predetermined function to data that changes on each recording on the optical disk 51. Thus, it is readily possible to determine whether last recording on the optical disk 51 was performed by an apparatus of the own machine type or by an apparatus of a different machine type.

The value input to the disk-identification-code calculator 42 is not limited to a data sequence composed of the management table TV, VMGI, and a random value, and may be the entire data recorded on the optical disk 51 or partial data recorded on the optical disk 51 (specific information on the optical disk 51) that is different from the management table TV and VMGI. In this case, data that is compressed for calculating a disk identification code is preferably data on the optical disk 51 that changes on each recording, deleting, or editing. Also, a compression function that yields different output values for different input values is used.

From these viewpoints, in this embodiment, a hash function is used as a function for calculating a disk identification code. This is because generally the probabilities of occurrence of output values of a hash function are uniform over the range of possible output values and the possibility of accidental matching of output values for different inputs (random value, the management table TV, and VMGI in this embodiment) can be reduced almost to zero by using a function having a large range of output values (e.g., a function that outputs 128-bit data).

When information is compressed using a hash function, i.e., when a hash value is calculated, it is not possible to restore the original data. However, in this embodiment, the hash value is used as a disk identification code for comparison, so that it does not matter even if it is not possible to restore the original data from the compressed data.

When data is written to the optical disk 51 according to Japanese Unexamined Patent Application Publication No. 2003-331563, in some cases, VMGI is not recorded on the optical disk 51. In this case, alternative data for VMGI data, e.g., NULL data, is used. Even in this case, since a disk identification code is generated on the basis of data recorded on the optical disk 51, the possibility of incorrect decision as to whether last recording was performed by an apparatus of the own machine type or by an apparatus of a different machine type can be reduced.

As described above, in the recording and playback apparatus 1 shown in FIG. 1, it is possible to determine whether last recorded on an optical disk (DVD) loaded thereon was performed by an apparatus of the own machine type. Thus, for example, the user can recognize that last recording on the optical disk was performed by an apparatus of a different machine type.

Although the embodiment has been described above in the context of an example where the recording and playback apparatus 1 records data on the optical disk 51, without limitation to the optical disk 51, other types of recording media may be used, such as magneto-optical disks, memory cards, or Memory Stick® devices.

Furthermore, although the embodiment has been described in the context of an example where thumbnail images are displayed when the optical disk 51 is loaded, for example, the cache of the apparatus may be used when a memory card on which a still image is recorded is loaded again and the still image recorded on the memory card is displayed. This allows the still image recorded on the memory card to be displayed quickly.

Furthermore, although a disk identification code is recorded when a disk is unloaded in the embodiment described above, alternatively, an identification code may be recorded on the disk each time a single recording process (e.g., step S17) is finished even if the disk is not unloaded. Yet alternatively, a disk identification code may be recorded each time a single title is closed.

The series of processes described above may be executed either by hardware or by software. In this embodiment, the series of processes described above is executed by a personal computer 250 shown in FIG. 19.

Figure 19:
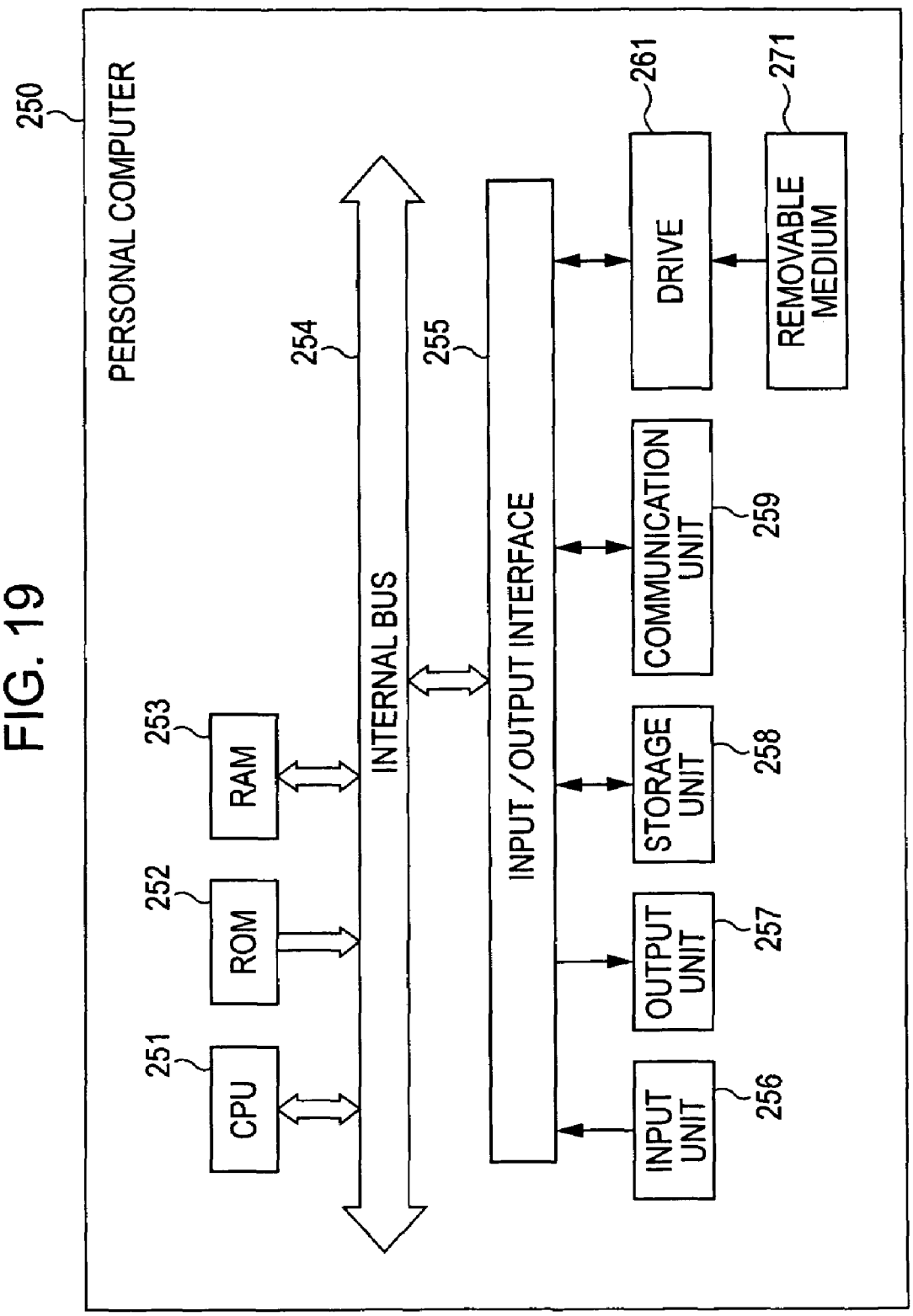
FIG. 19 is a diagram showing an example construction of a personal computer.

Referring to FIG. 19, a CPU 251 executes various processes according to programs stored in a ROM 252 or programs loaded from a storage unit 258 to a RAM 253. The RAM 253 also stores, as needed, data needed for execution of various processes by the CPU 251.

The CPU 251, the ROM 252, and the RAM 253 are connected to each other via an internal bus 254. The internal bus 254 is also connected to an input/output interface 255.

The input/output interface 255 is connected to an input unit 256 including, for example, a keyboard and a mouse, an output unit 257 including, for example, a speaker and a display implemented by a CRT display or an LCD, a storage unit 258 implemented by a hard disk or the like, and a communication unit implemented by a modem, a terminal adaptor, or the like. The communication unit 259 carries out communications via various networks such as telephone circuits or CATV networks.

The input/output interface 255 is connected to a drive 261 as needed, and a removable medium 271, such as a magnetic disk, an optical disk, a magneto-optical disk, or a semiconductor memory is loaded thereon as needed. Computer programs read from the removable medium 271 is installed on the storage unit 258 as needed.

When the series of processing is executed by software, programs constituting the software are installed via a network or from a recording medium.

The recording medium may be a package medium implemented by the removable medium 271 having the programs recorded thereon, which is distributed for providing the user with the programs separately from a computer. Alternatively, the recording may be the ROM 252 or the hard disk of the storage unit 258 having the programs recorded thereon, which is provided to the user as included in the main unit of an apparatus.

The steps of the computer programs need not be executed sequentially in the orders described in this specification, and may include steps executed in parallel or individually.

In this specification, a system refers to the entirety of a plurality of apparatuses.

It should be understood by those skilled in the art that various modivications, combinations, sub-combinations and alterations may occur depending on design requirements and other factors insofar as they are within the scope of the appended claims or the equivalents thereof.

The invention claimed is:

1. A recording and playback apparatus for recording data on a recording medium that allows additional writing, the recording and playback apparatus comprising:
   recording means for recording first data on the recording medium;
   random-number generating means for generating a random number; and
   calculating means for calculating a first apparatus identification code, the apparatus identification code indicating that the first data has been recorded on the recording medium particularly by the recording and playback apparatus, by applying a predetermined function to data included in the first data recorded on the recording medium by the recording means, the data including second data that changes on each recording on the recording medium by the recording means and including the random value generated by the random-value generating means;
   wherein the recording means further records the random value generated by the random-number generating means and the first apparatus identification code calculated by the calculating means on the recording medium so that the random value and the first apparatus identification code are included in the first data.

2. The recording and playback apparatus according to claim 1, further comprising:
   reading means for reading the first data recorded on the recording medium by the recording means;
   data generating means for generating third data by executing predetermined processing on the basis of specific data in the first data read by the reading means;
   storage means for storing the third data generated by the data generating means and a first apparatus identification code associated with the third data; and
   executing means for executing processing on the basis of the third data stored by the storage means when the third data is effective;
   wherein the calculating means calculates a second apparatus identification code by applying the predetermined function to the data including the second data and the random value, the data being included in the first data read by the reading means, and
   wherein the executing means assumes the third data stored in the storage means as effective and executes the processing on the basis of the third data when the second apparatus identification code calculated by the calculating means coincides with the first apparatus identification code read by the reading means and the first apparatus identification code read by the reading means coincides with the first apparatus identification code stored in the storage means.

3. The recording and playback apparatus according to claim 1,
   wherein the calculating means calculates the first apparatus identification code by applying a function that yields an amount of data smaller than the data including the second data and the random value.

4. The recording and playback apparatus according to claim 3,
   wherein the calculating means calculates the first apparatus identification code by applying a hash function to the data including the second data and the random value.

5. The recording and playback apparatus according to claim 1,
   wherein the second data at least includes data that is recorded only by the recording and playback apparatus.

6. The recording and playback apparatus according to claim 5,
   wherein the second data includes data for managing a program area of the recording medium and control data for the recording medium.

7. A recording and playback method of a recording and playback apparatus for recording data on a recording medium that allows additional writing, the recording and playback method comprising the steps of:
   recording first data on the recording medium;
   generating a random number;
   calculating a first apparatus identification code, the first apparatus code indicating that the first data has been recorded on the recording medium particularly by the recording and playback apparatus, by applying a predetermined function to data included in the first data recorded on the recording medium, the data including second data that changes on each recording on the recording medium and including the random value generated; and
   further recording the random value generated and the first apparatus identification code calculated on the recording medium so that the random value and the first apparatus identification code are included in the first data.

8. A process for allowing a computer in a recording and playback apparatus to execute processing for recording data on a recording medium that allows additional writing, the process comprising the steps of:

recording first data on the recording medium;

generating a random number;

calculating a first apparatus identification code with a processor of the computer, the first apparatus identification code indicating that the first data has been recorded on the recording medium particularly by the recording and playback apparatus, by applying a predetermined function to data included in the first data recorded on the recording medium, the data including second data that changes on each recording on the recording medium and including the random value generated; and further recording the random value generated and the first apparatus identification code calculated on the recording medium so that the random value and the first apparatus identification code are included in the first data.

9. A recording and playback apparatus for recording data on a recording medium that allows additional writing, the recording and playback apparatus comprising:

a recording device configured to record first data on the recording medium;

a random-number generator configured to generate a random number; and a calculator configured to calculate a first apparatus identification code, the first apparatus identification code indicating that the first data has been recorded on the recording medium particularly by the recording and playback apparatus, by applying a predetermined function to data included in the first data recorded on the recording medium by the recording device, the data including second data that changes on each recording on the recording medium by the recording device and including the random value generated by the random-value generator;

wherein the recording device further records the random value generated by the random-number generator and the first apparatus identification code calculated by the calculator so that the random value and the first apparatus identification code are included in the first data.

10. A recording medium for processor control instructions, the processor control instructions comprising a program for allowing a processor in a recording and playback apparatus to execute processing for recording data on a recording medium that allows additional writing, the processor control instructions further comprising:

instructions to control recording first data on the recording medium;

instructions to control generating a random number;

instructions to control calculating a first apparatus identification code, the first apparatus identification code indicating that the first data has been recorded on the recording medium particularly by the recording and playback apparatus, by applying a predetermined function to data included in the first data recorded on the recording medium, the data including second data that changes on each recording on the recording medium and including the random value generated; and instructions to control further recording the random value generated and the first apparatus identification code calculated on the recording medium so that the random value and the first apparatus identification code are included in the first data.

* * * * *